United States Patent
Park et al.

(10) Patent No.: US 10,820,325 B2
(45) Date of Patent: Oct. 27, 2020

(54) APPARATUS AND METHOD FOR CONTROLLING CHANNEL ACCESS IN WIRELESS COMMUNICATION SYSTEM

(71) Applicants: Samsung Electronics Co., Ltd., Suwon-si, Gyeonggi-do (KR); KOREA UNIVERSITY RESEARCH AND BUSINESS FOUNDATION, Seoul (KR)

(72) Inventors: Seung-Hoon Park, Seoul (KR); Chung-Gu Kang, Seoul (KR); Chung-Kee Kim, Seoul (KR); Chan-Seok Yang, Yongin-si (KR); Jung-Min Moon, Suwon-si (KR)

(73) Assignees: Samsung Electronics Co., Ltd., Suwon-si (KR); Korea University Research and Business Foundation, Seoul (KR)

( * ) Notice: Subject to any disclaimer, the term of this patent is extended or adjusted under 35 U.S.C. 154(b) by 0 days.

(21) Appl. No.: 15/753,418

(22) PCT Filed: Aug. 16, 2016

(86) PCT No.: PCT/KR2016/008971
§ 371 (c)(1),
(2) Date: Feb. 19, 2018

(87) PCT Pub. No.: WO2017/030340
PCT Pub. Date: Feb. 23, 2017

(65) Prior Publication Data
US 2018/0249469 A1   Aug. 30, 2018

(30) Foreign Application Priority Data
Aug. 19, 2015 (KR) .................. 10-2015-0116672

(51) Int. Cl.
*H04W 72/04* (2009.01)
*H04W 74/08* (2009.01)
(Continued)

(52) U.S. Cl.
CPC ....... *H04W 72/0486* (2013.01); *H04W 16/14* (2013.01); *H04W 72/04* (2013.01);
(Continued)

(58) Field of Classification Search
None
See application file for complete search history.

(56) References Cited

U.S. PATENT DOCUMENTS

2002/0181417 A1\* 12/2002 Malhotra ............. H04W 72/02
370/329
2008/0107113 A1\* 5/2008 Wentink ............ H04W 52/0225
370/392
(Continued)

FOREIGN PATENT DOCUMENTS

KR   10-2009-0083760 A   8/2009
KR   10-2010-0059294 A   6/2010
(Continued)

OTHER PUBLICATIONS

3GPP TR 36.889 V1.0.0 "3rd Generation Partnership Project; Technical Specification Group Radio Access Network; Study on Licensed-Assisted Access to Unlicensed Spectrum; (Release 13)," May 2015, 87 pages.
(Continued)

*Primary Examiner* — Faruk Hamza
*Assistant Examiner* — Cassandra L Decker

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). A base
(Continued)

station apparatus according to various embodiments may comprise: a communication unit configured to transmit or receive information; and a control unit coupled to the communication unit, wherein the control unit may be configured to receive, from at least one other base station that shares a frequency band, first information associated with one or more of a second base station and a second terminal included in a second system that shares the frequency band, determine a transmission start alignment interval on the basis of the received first information, and transmit information on the transmission start alignment interval to the at least one other base station.

20 Claims, 29 Drawing Sheets

(51) Int. Cl.
*H04W 74/00* (2009.01)
*H04W 16/14* (2009.01)
*H04W 16/10* (2009.01)

(52) U.S. Cl.
CPC ....... *H04W 72/0446* (2013.01); *H04W 74/00* (2013.01); *H04W 74/08* (2013.01)

(56) References Cited

U.S. PATENT DOCUMENTS

| | | | | |
|---|---|---|---|---|
| 2009/0046665 | A1* | 2/2009 | Robson | H04W 36/04 370/332 |
| 2009/0190566 | A1 | 7/2009 | Kwon et al. | |
| 2012/0106495 | A1 | 5/2012 | Yang et al. | |
| 2013/0128840 | A1* | 5/2013 | Sun | H04L 5/0007 370/329 |
| 2013/0176877 | A1* | 7/2013 | Sadek | H04W 24/02 370/252 |
| 2013/0208587 | A1 | 8/2013 | Bala et al. | |
| 2014/0341135 | A1 | 11/2014 | Bhushan et al. | |
| 2015/0043363 | A1* | 2/2015 | Koskinen | H04W 16/14 370/252 |
| 2015/0148053 | A1* | 5/2015 | Patel | H04W 72/0426 455/452.1 |
| 2015/0382374 | A1* | 12/2015 | Bhorkar | H04W 24/00 370/330 |
| 2016/0119924 | A1* | 4/2016 | Lindoff | H04W 16/14 370/338 |
| 2016/0309511 | A1* | 10/2016 | Li | H04W 74/0808 |
| 2016/0345345 | A1* | 11/2016 | Malik | H04W 48/04 |
| 2017/0127450 | A1* | 5/2017 | Luo | H04W 16/02 |
| 2017/0164384 | A1* | 6/2017 | Wang | H04W 72/1289 |
| 2017/0238319 | A1* | 8/2017 | Luft | H04L 5/0058 370/329 |
| 2017/0302312 | A1* | 10/2017 | Guan | H04W 16/10 |

FOREIGN PATENT DOCUMENTS

| | | |
|---|---|---|
| KR | 10-2014-0125408 A | 10/2014 |
| WO | 2011-013977 A2 | 2/2011 |

OTHER PUBLICATIONS

3GPP TR 37.802 V10.1.0 "3rd Generation Partnership Project; Technical Specification Group Radio Access Network; Multi-standard radio Base Station (BS) Radio Frequency (RF) requirements for non-contiguous spectrum deployments (Release 10)," Sep. 2011, 29 pages.

Samsung, "Further Analysis on LBE Options for Reuse-1 LAA," R1-153415, 3GPP TSG RAN WG1 #81, Fukuoka, Japan, May 25-29, 2015, 9 pages.

IEEE Standards Association, "Part 11: Wireless LAN Medium Access Control (MAC) and Physical Layer (PHY) Specifications," IEEE Std 802.11-2012 (Revision of IEEE Std 802.11-2007), Mar. 29, 2012, 2793 pages.

ISA/KR, "International Search Report and Written Opinion of the International Searching Authority," PCT/KR2016/008971, Nov. 21, 2016, 10 pages.

* cited by examiner

APPARATUS AND METHOD FOR CONTROLLING CHANNEL ACCESS IN WIRELESS COMMUNICATION SYSTEM

CROSS-REFERENCE TO RELATED APPLICATIONS AND CLAIM OF PRIORITY

This application is a 371 of International Application No. PCT/KR2016/008971, filed Aug. 16, 2016, which claims priority to Korean Patent Application No. 10-2015-0116672, filed Aug. 19, 2015, the disclosures of which are herein incorporated by reference in their entirety.

TECHNICAL FIELD

The following embodiments relate to resource control in an environment where different communication systems coexist.

BACKGROUND

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

As the usage of wireless terminals or the like has increased, demands for an increase in wireless resources have also increased. Responding to the demands, the number of cases in which different types of communication systems coexist has been increased.

SUMMARY

Therefore, the following embodiments provide a method and an apparatus for sharing a channel in an environment where different communication systems coexist.

Also, the following embodiments provide a method and an apparatus for controlling access to a shared channel in an environment where different communication systems coexist.

An operation method of a base station of a first system according to various embodiments may include: receiving information on a transmission start alignment interval; and communicating with a first terminal based on the transmission start alignment interval, and the transmission start alignment interval is determined based on first information, which is related to one or more of a second base station and a second terminal of a second system that shares a frequency band with the first system.

An operation method of a base station according to various embodiments may include: receiving first information related to one or more of a second base station and a second terminal included in a second system that shares a frequency band, from at least one other base station that shares the frequency band; determining a transmission start alignment interval based on the received first information; and transmitting information on the transmission start alignment interval to at least one other base station.

An apparatus of a base station of a first system according to various embodiments may include a communication unit configured to transmit or receive information, and a controller coupled with the communication unit. The controller may be configured to receive information on a transmission start alignment interval, and to communicate with a first terminal based on the transmission start alignment interval. The transmission start alignment interval may be determined based on first information related to one or more of a second base station and a second terminal of a second system that shares a frequency band with a first system.

An apparatus of a base station according to various embodiments may include a communication unit configured to transmit or receive information, and a controller coupled with the communication unit. The controller may be configured to receive first information related to one or more of a second base station and a second terminal included in a second system that shares a frequency band from at least one other base station that shares the frequency band, may be configured to determine a transmission start alignment interval based on the received first information, and may be configured to transmit to information on the transmission start alignment interval to at least one other base station.

An apparatus and an operation method according to various embodiments may control access to a shared channel in an environment where various communication systems coexist, whereby the throughput of whole system may be improved.

Effects which can be acquired by the present disclosure are not limited to the above described effects, and other effects that have not been mentioned may be clearly understood by those skilled in the art from the following description.

BRIEF DESCRIPTION OF THE DRAWINGS

Detailed description will be provided with reference to the accompanying drawings for complete understanding of the present disclosure. Like reference numerals may refer to like components throughout.

DETAILED DESCRIPTION

Figure 1:
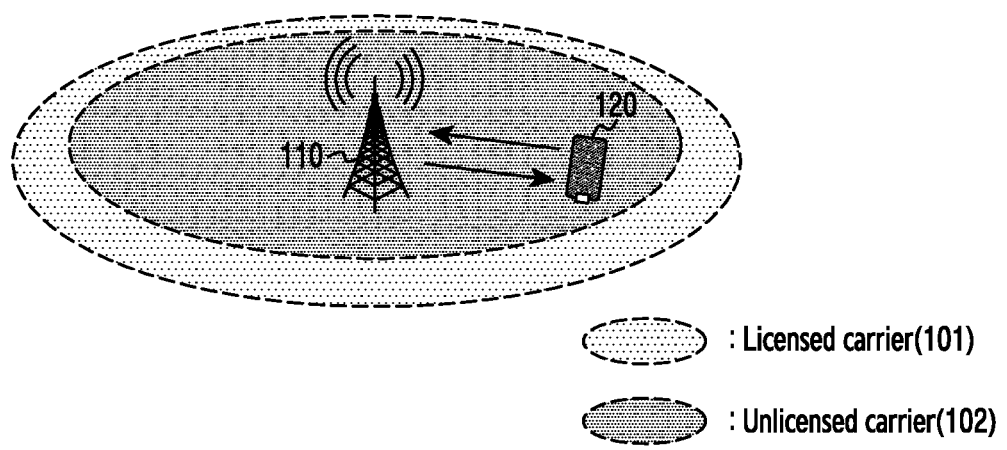
FIG. 1 illustrates an example of a wireless network environment in which two different carriers are used.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

The terms used herein are merely for the purpose of describing particular embodiments and may not be intended to limit the scope of other embodiments. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

Hereinafter, various embodiments of the present disclosure will be described based on an approach of hardware. However, various embodiments of the present disclosure include a technology that uses both hardware and software and thus, the various embodiments of the present disclosure may not exclude the perspective of software.

FIG. 1 illustrates an example of a wireless network environment in which two different carriers are used.

Referring to FIG. 1, the wireless network environment may include a base station 110 and a terminal 120. Although the base station 110 is illustrated as a single base station in FIG. 1, the base station 110 may indicate a plurality of base stations. For example, the base station 110 may be a group of a plurality of base stations using the same frequency band through a frequency reuse scheme. Although the terminal 120 is illustrated as a single terminal in FIG. 1, the terminal 110 may indicate a plurality of terminals. For example, the terminal 120 may be a plurality of terminals that receive a service from the base station 110. The base station 110 may be referred to as the first base station 110. The terminal 120 may be referred to as the first terminal 120.

The base station 110 and the terminal 120 may perform communication using a licensed carrier 101 and an unlicensed carrier 102. The licensed carrier 101 may be a carrier that uses a frequency band allowed for the system. The unlicensed carrier 102 may be a carrier that uses a frequency band that is not allowed for the system. Here, the unlicensed frequency band may be an industrial scientific and medical (ISM) band. Also, the unlicensed frequency band may be a guard band of a licensed frequency band. For example, a system according to various embodiments may adapt a Long Term Evolution-unlicensed (LTE-U) technology.

A band used by the unlicensed carrier 102 may be shared with another system. For example, the other system may use an un-synchronized ratio access scheme. Particularly, the other system may use a Wireless Local Area Network (WLAN) technology which is based on Wireless Fidelity (Wi-Fi).

Figure 2:
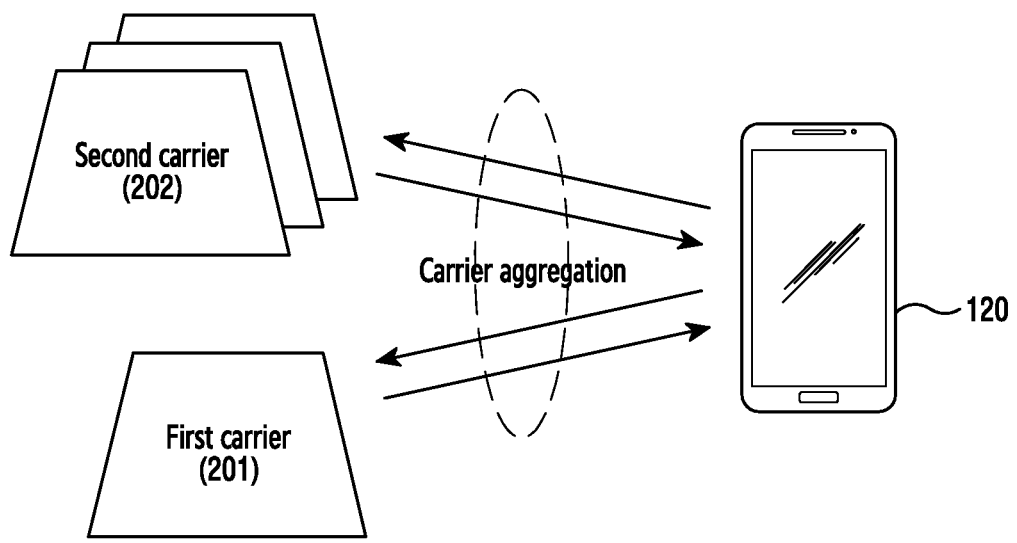
FIG. 2 illustrates an example in which carrier aggregation (CA) is used in a wireless communication system.

FIG. 2 illustrates an example in which Carrier Aggregation (CA) is used in a wireless communication system.

Referring to FIG. 2, the terminal 120 may transmit and receive a signal through the base station 110 and a primary carrier 201. The terminal 120 may transmit and receive a signal through the base station 110 and a secondary carrier 202. The terminal 120 may have larger communication capacity through carrier aggregation using the primary carrier 201 and the secondary carrier 202. The carrier aggregation is to provide a service using two frequencies together, which is a technology that simultaneously uses a plurality of carriers for one terminal. Depending on cases, the carrier aggregation may be performed by the combination of different radio access technologies. For example, the carrier aggregation may be performed by the combination of LTE technologies, the combination of LTE technology and $3^{rd}$ generation (3G) technology, and the combination of LTE technology and Wi-Fi technology. The primary carrier 201 may include the licensed carrier 101 of FIG. 1. The secondary carrier 202 may include the unlicensed carrier 102. That is, the primary carrier 201 may occupy the licensed band, and the secondary carrier 202 may occupy the unlicensed band shared with a second system. The terminal 120 may utilize a larger amount of radio resources through the carrier aggregation.

Figure 3:
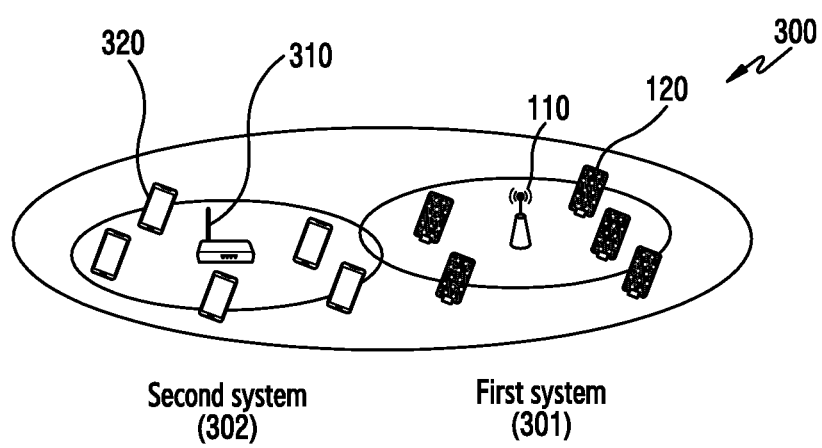
FIG. 3 illustrates an example of a network environment where two different communication systems coexist according to various embodiments.

FIG. 3 illustrates an example of a network environment where two different communication systems coexist according to various embodiments. FIG. 3 is an example in which an unlicensed band is shared by a first system 301 and a second system 302.

Referring to FIG. 3, a coexistence network 300 may include a first system 301 and a second system 302. The first system 301 may include the base station 110 and the terminal 120 of FIG. 1. The second system 302 may include a base station 310 and a terminal 320. Although the base station 110 and the base station 310 are illustrated separately for ease of description, the base station 110 and the base station 310 may be implemented as a single base station. That is, the base station 110 and the base station 310 may be a single base station that is capable of performing different types of communication services in parallel. Although the terminal 120 and the terminal 320 are illustrated separately for ease of description, the terminal 120 and the terminal 320 may be implemented as a single terminal. That is, the terminal 120 and the terminal 320 may be a terminal that is capable of performing different types of communication services in parallel. The base station 310 may be referred to as the second base station 310. The terminal 320 may be referred to as the second terminal 320.

The first system 301 and the second system 302 may occupy an unlicensed band. Here, the unlicensed band may be an ISM band. Also, the unlicensed band may be a guard band of an LTE system. The first system 301 and the second system 302 may perform communication by sharing the same band.

According to various embodiments, the first system 301 and the second system 302 may operate in a communication standard environment that uses an unlicensed carrier. For example, the communication standard may include a Wireless Local Area Network (WLAN), a Long Term Evolution-Unlicensed (LTE-U), or the like. The first system 301 and the second system 302 may be capable of mutually interpreting messages from each another. Band sharing between the first system 301 and the second system 302 may be based on a Listen Before Talk (LBT) scheme. The LBT scheme indicates a scheme that recognizes whether a selected resource is used by another system, and selects another resource when it is determined that the other system occupies the selected resource. The first system 301 may be a system that newly enters the unlicensed band. The second system 302 may be a system that already exists in the unlicensed band. Since the capacity of communication resources is limited, the performance of the second system 302 may deteriorate by the first system 301 that newly enters.

Therefore, various embodiments may provide a method and apparatus for improving the performance of the whole network 300 (or system) by improving the performance of the first system while maintaining the performance of the second system.

Figure 4:
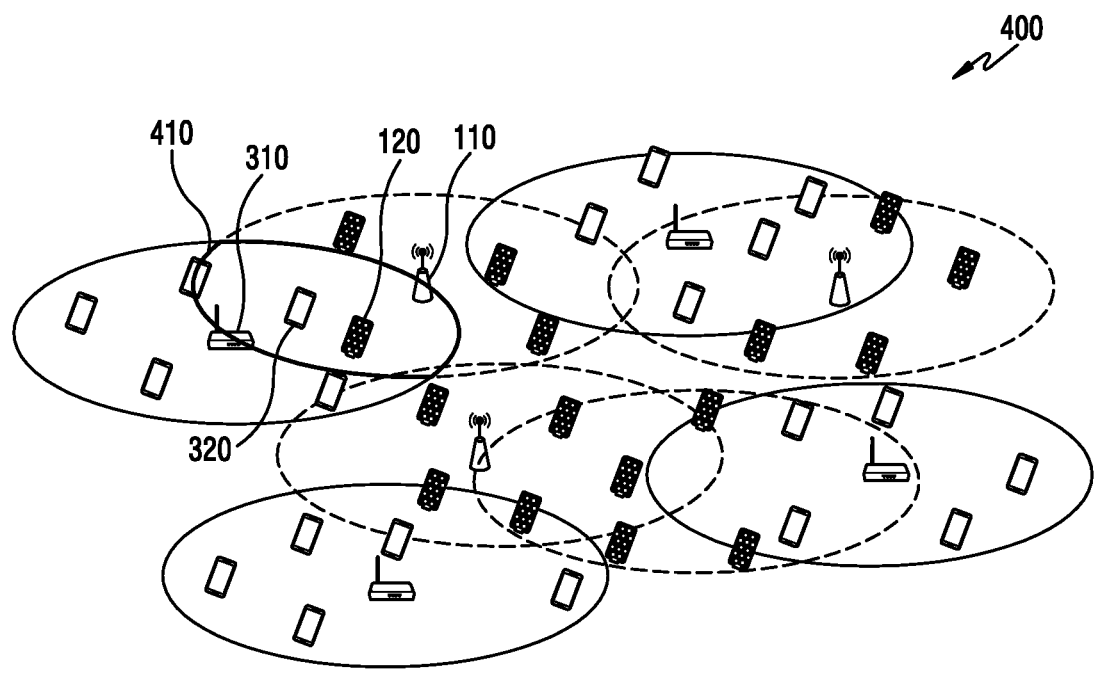
FIG. 4 illustrates an example in which two communication services are provided in a network where two different communication systems coexist according to various embodiments.

FIG. 4 illustrates an example in which two communication services are provided in a network where two different communication systems coexist according to various embodiments.

Referring to FIG. 4, a communication system 400 may include the base station 110 of FIG. 1, the terminal 120 of FIG. 1, the base station 310 of FIG. 3, and the terminal 320 of FIG. 3. The base station 110 and the base station 310 may be small cell base stations (e.g., picocell, femtocell, or the like) having a low transmission power and a narrow coverage range. The base station 110 and the base station 310 may provide different communication services. The terminal 120 and the terminal 320 may be located an area 410 where the coverage range of the base station 110 and the coverage range of the base station 310 overlap.

The base station 110 may be a base station that provides a service using a synchronous radio access scheme (e.g., Orthogonal Frequency Division Multiple Access (OFDMA) scheme) that requires frame synchronization. For example, the base station 110 may be a base station that services LTE-U. The base station 110 may be a base station for the first system 301 of FIG. 3. The terminal 120 may be a terminal that communicates with the base station 110. The terminal 120 may be a terminal for the first system 301.

The base station 310 may be a base station that provides a service using a non-synchronous radio access scheme (e.g., IEEE 802.11 Wi-Fi standard CSMA/CA scheme) that does not require frame synchronization. For example, the base station 310 may be a base station that provides a WLAN service. The base station 310 may be a base station for the second system 302 of FIG. 3. The terminal 320 may be a terminal that communicates with the base station 310. The terminal 320 may be a terminal for the second system 302.

The base station 110, the terminal 120, the base station 310, and the terminal 320 may share the same frequency band. The base station 110 may perform energy detection. For example, the base station 110 may recognize a signal transmitted or received by the base station 310 using the same frequency band, and a signal transmitted or received by the terminal 320, through the energy detection. The base station 110 may utilize a frequency band based on the recognized information.

Figure 5:
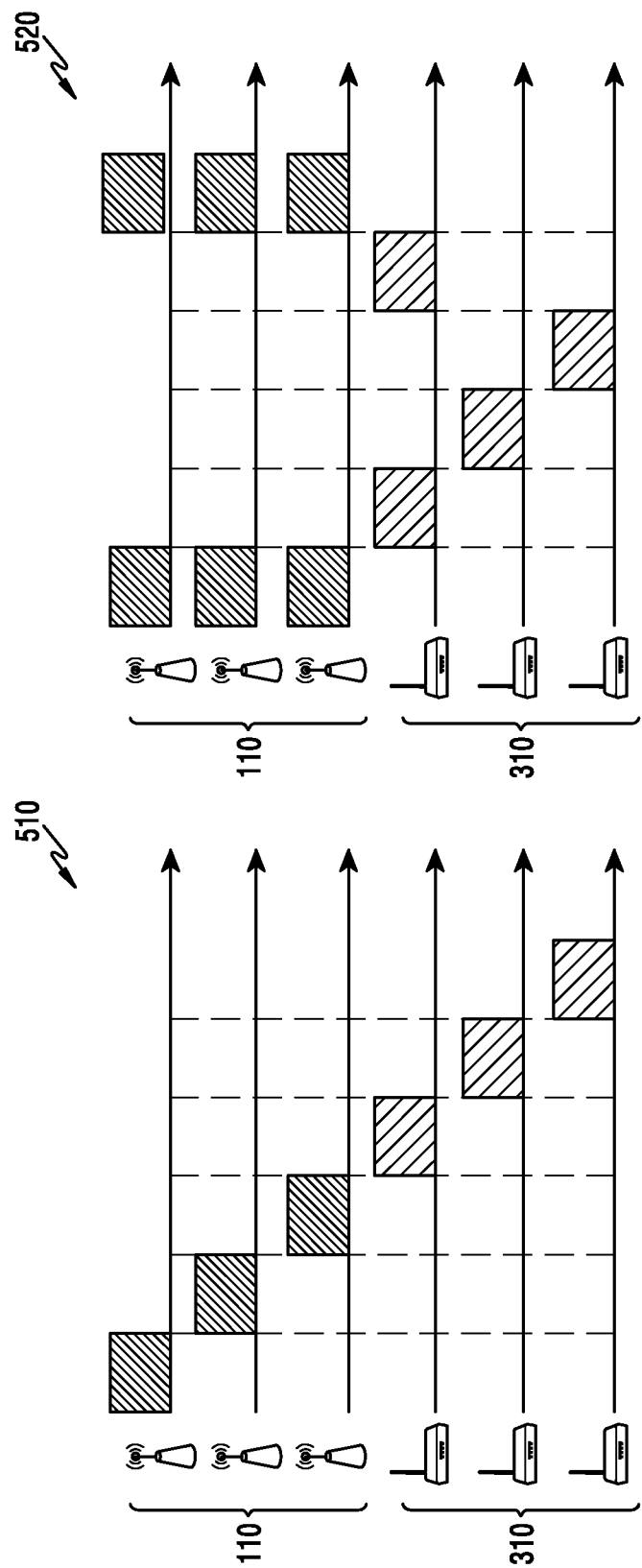
FIG. 5 illustrates an example of frequency reuse and time resources.

FIG. 5 illustrates an example of frequency reuse and time resources.

Referring to FIG. 5, a resource distribution chart 510 is an example of time resources used by the base station 110 and the base station 310 when a frequency reuse scheme is not used. The base station 110 and the base station 310 may orthogonally share time resources to prevent collision or interference. In the example of the resource distribution chart 510, three time resources exist as time resources that the base station 110 can utilize, three time resources exist as time resources that the base station 310 can utilize, and six time resources exist as time resources that the whole system can utilize.

A resource distribution chart 520 may be an example of time resources that the base station 110 and the base station 310 may use when a frequency reuse scheme (particularly, Reuse-1) is used. The base station 110 may be a base station capable of using a frequency reuse scheme. The base station 310 may be a base station incapable of using a frequency reuse scheme. For example, the base station 110 may be a base station included in a Long Term Evolution-Unlicensed (LTE-U) system. Through Adaptive Modulation and Coding (AMC), Hybrid Automatic Repeat reQuest (H-ARQ) or the like, the base station 110 may remedy interference or collision that is attributable to the use of the same time resource. In the example of the resource distribution chart 520, six resources exist as resources that the base station 110 can utilize, four resources exist as resources that the base station 310 can utilize, and ten resources exist as resources that the whole system can utilize. That is, when a frequency reuse scheme is used as in the example of the resource distribution chart 520, the limited amount of resources can be more efficiently utilized. The base station 110 according to various embodiments can efficiently utilize the limited amount of resources using the frequency reuse scheme.

Figure 6:
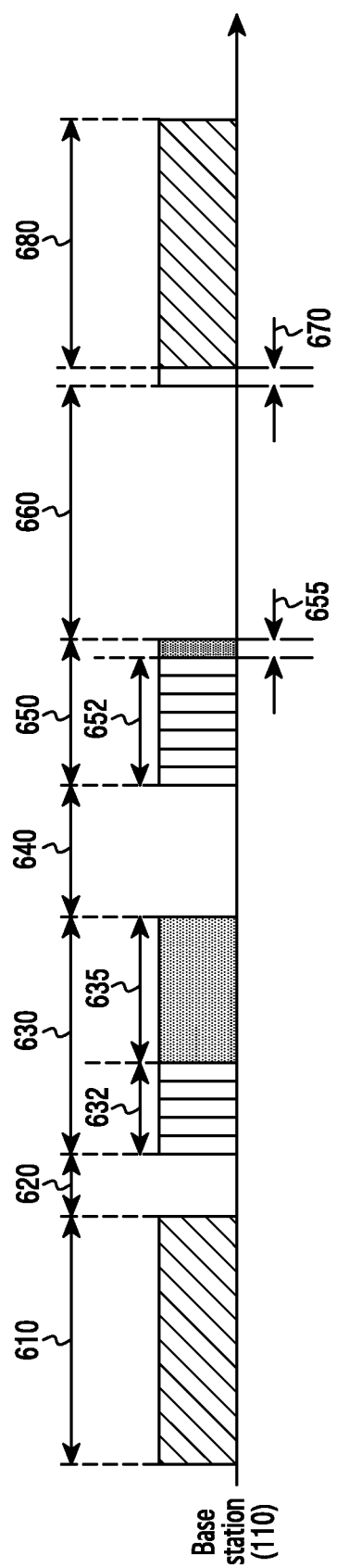
FIG. 6 illustrates a concept of resources of load-based Listen Before Talk (LBT)

FIG. 6 illustrates a concept of resources of load-based Listen Before Talk (LBT).

The LBT scheme indicates a scheme that recognizes whether a selected resource is used by another system, and selects another resource when it is determined that the other system occupies the selected resource.

An apparatus that uses an unlicensed band, like the base station 110 of FIG. 1, may be classified as a frame-based LBT apparatus or a load-based LBT apparatus.

The frame-based LBT apparatus may perform Clear Channel Assessment (CCA) during at least 20 μs before performing transmission. The CCA may be an operation in which the frame-based apparatus measures the magnitude of interference, and determines whether another apparatus uses an unlicensed band. When the magnitude of interference is greater than or equal to a predetermined value, the frame-based LBT apparatus may not perform transmission. When the magnitude of interference is less than the predetermined value, the frame-based LBT apparatus may perform transmission. When the frame-based LBT apparatus performs CCA and determines that an unlicensed band is available, the frame-based LBT apparatus may occupy an unlicensed band from at least 1 ms to a maximum of 10 ms. After the occupation, the frame-based LBT apparatus may not perform transmission at least 5% of the occupancy time. A time interval in which the transmission is not performed may be referred to as a waiting interval. When a result obtained by performing CCA shows that another apparatus uses the unlicensed band (that is, when it is determined that the magnitude of interference is greater than or equal to a predetermined value), the frame-based LBT apparatus may perform CCA again after a fixed frame period elapses.

The load-based LBT apparatus may perform CCA during at least 20 μs before performing transmission. When a result obtained by performing CCA shows that no apparatus uses the unlicensed band (that is, when it is determined that the magnitude of interference is less than a predetermined value), the load-based LBT apparatus may perform transmission. When a result obtained by performing CCA shows that an apparatus that uses the unlicensed band exists (that is, when it is determined that the magnitude of interference is greater than or equal to a predetermined value), the load-based LBT apparatus may perform additional CCA, unlike the frame-based apparatus. The additional CCA may be referred to as an extended CCA (ECCA). The ECCA may include N CCAs. N may be an integer in a range of [1,q]. N is a value that may vary every time that ECCA is performed, and may be a value that is randomly selected from integers greater than or equal to 1 and less than or equal to q. q may be an integer, which is a value associated with an unlicensed band (or channel) occupancy time of the load-based apparatus. The load-based LBT apparatus may decrease a CCA counter value of N by one for each time that one of the CCAs included in ECCA is successfully performed. When it is detected that another apparatus occupies the unlicensed band before the CCA counter becomes 0, the load-based LBT apparatus may perform an operation (freezing) that waits until the occupancy of the unlicensed band is released. When it is determined that the occupancy of the unlicensed band is released, the load-based apparatus may resume an operation of decreasing the CCA counter. When the CCA counter becomes 0, the load-based apparatus may occupy the unlicensed band during a channel occupancy time (COT), and may perform transmission. The COT may have a value of a maximum of $(13/32) \times q$. q may be defined as an integer in a range from 4 to 32.

Referring to FIG. 6, the base station 110 may be a load-based LBT apparatus.

The base station 110 may occupy an unlicensed band during a time interval 610, and may perform transmission. The time interval 610 may be a COT. The time interval 610 may have a value of a maximum value of $(13/32) \times q$.

The base station 110 may perform transmission during the time interval 610, and may be in a waiting state during a time interval 620. Also, the base station 110 may perform transmission during the time interval 610, and may perform CCA during the time interval 620.

The base station 110 may determine whether an unlicensed band is used by another apparatus during a time interval 630. That is, the time interval 630 may be ECCA including 13 CCAs (in other words, ECCA of which a CCA counter is 13), wherein 13 is an integer randomly selected from among integers in a range from 1 to q. The base station 110 determines that another apparatus that uses an unlicensed band does not exist during a time interval 632, and decreases the CCA counter by 5. The base station 110 may detect that another apparatus uses an unlicensed band at a $6^{th}$ CCA included in the ECCA. In response to the fact that the other apparatus uses the unlicensed band, the base station 110 waits until the occupancy of the unlicensed band by the other apparatus is released during a time interval 635 and a time interval 640. That is, the base station 110 may perform a freezing operation during the time interval 635 and the time interval 640.

The base station 110 may determine whether an unlicensed band is used by another apparatus during a time interval 650. That is, the time interval 650 may be a time interval that corresponds to 8 CCAs (the CCA counter indicating 8 left) remaining after excluding CCAs that are removed from the ECCA during the time interval 632. The base station 110 determines that another apparatus that uses an unlicensed band does not exist during a time interval 652, and decreases the CCA counter by 7. The base station 110 may detect that another apparatus uses an unlicensed band at a $13^{th}$ CCA included in the ECCA. In response to the fact that the other apparatus uses the unlicensed band, the base station 110 waits until the occupancy of the unlicensed band by the other apparatus is released during a time interval 655 and a time interval 660. That is, the base station 110 may perform a freezing operation during the time interval 655 and the time interval 660.

The base station 110 may determine whether an unlicensed band is used by another apparatus during a time interval 670. That is, the time interval 670 may be a time interval that corresponds to 1 CCA (the CCA counter indicating 1 left) remaining after excluding CCAs that are removed from the ECCA during the time interval 632 and the time interval 652. The base station 110 determines that another apparatus does not occupy the unlicensed band during the time interval 670, and sets the CCA counter to 0.

The base station 110 may perform transmission during a time interval 680. The time interval 680 may be a COT.

Figure 7:
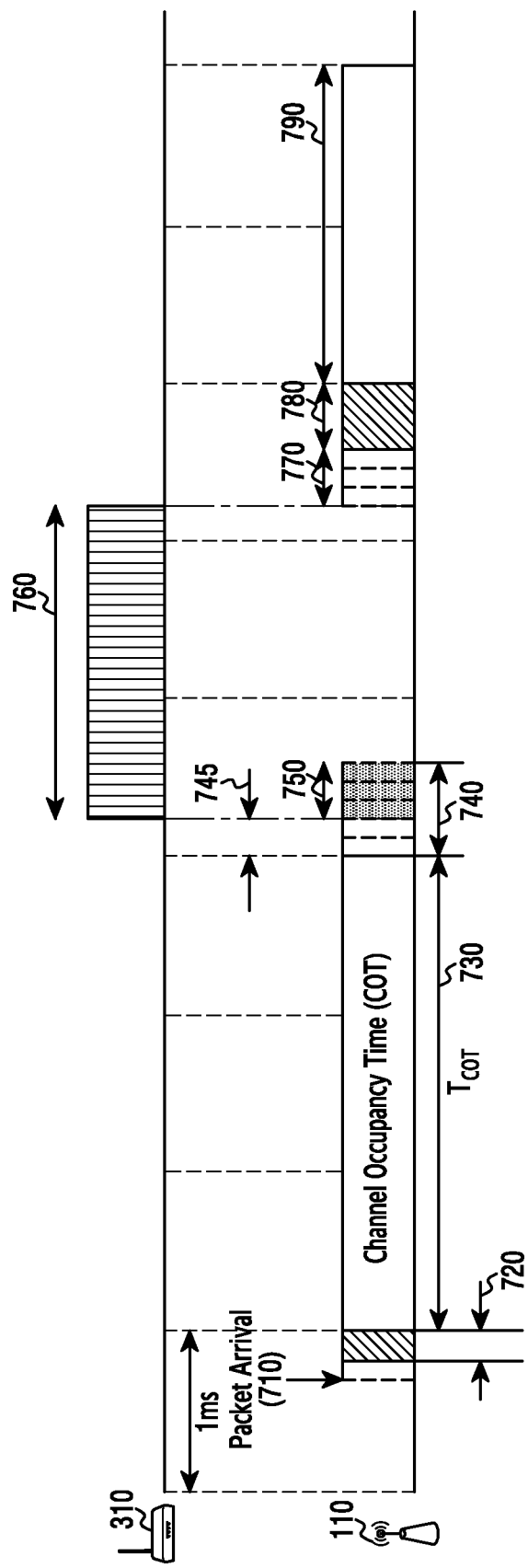
FIG. 7 illustrates operation of a base station that matches a subframe boundary and a point in time at which an unlicensed band is used.

FIG. 7 illustrates operation of a base station that matches a subframe boundary and a point in time at which an unlicensed band is used.

The load-based LBT apparatus, such as the base station 110 of FIG. 1, may have an additional opportunity of using an unlicensed band through ECCA. Therefore, the load-based apparatus may have a higher probability of occupying an unlicensed band than that of the frame-based apparatus. However, the load-based apparatus randomly select N, which is the number of CCAs included in ECCA, and thus, the load-based apparatus may not match a subframe boundary and a point in time at which the use of the unlicensed band starts. The load-based apparatus may transmit a reservation signal or an initial signal at a current subframe in order to overcome the mismatch. When the point in time at which the use of the unlicensed band starts matches the subframe boundary, the load-based apparatus may perform transmission.

Referring to FIG. 7, intervals distinguished by a broken line may indicate subframes in FIG. 7. Each subframe may have a length of 1 ms.

The base station 110 may receive a packet at a point 710.

The base station 110 may perform ECCA (including one CCA) in response to the reception of the packet. When the unlicensed band is not occupied by another apparatus (e.g., the base station 310) while the base station 110 performs CCA, the base station 110 may attempt to transmit the packet.

However, as illustrated in FIG. 7, in the case of the load-based LBT, a subframe boundary and the end point of the ECCA may not match. When the mismatch occurs, the base station 110 may occupy the unlicensed band through an initial signal or a reservation signal during a time interval 720 in order to match the transmission point to the subframe boundary.

When the subframe boundary is matched, the base station 110 may transmit the packet during a time interval 730. The time interval 730 may be a COT having the maximum occupancy time. That is, although the base station 110 does not complete the transmission of the packet, the base station 110 may occupy a channel during the time interval 730.

The base station 110 may perform ECCA during a time interval 740. The ECCA may include 5 CCAs (5 being an integer randomly selected from among integers in a range from 1 to q). When the base station 110 determines that another apparatus (e.g., the base station 310) that uses the unlicensed band does not exist during a time interval 745, the base station 110 decreases a CCA counter by 2. The base station 110 may detect that the base station 310 uses the unlicensed band at a 3rd CCA included in the ECCA. The base station 110 may perform ECCA (including CCAs remaining after excluding 2 CCAs from 5 CCAs) corresponding to a time interval 750 at a next transmission opportunity. The base station 310 may perform transmission during a time interval 760.

When the base station 110 determines that another apparatus (e.g., the base station 310) that uses the unlicensed band does not exist during a time interval 770, the base station 110 may decrease the CCA counter by 3.

Since the CCA counter becomes 0, the base station 110 may attempt to transmit the packet.

However, since the end point of the time interval 770 (i.e., the end point of the ECCA) does not match a subframe boundary, the base station 110 may occupy a channel of the unlicensed band through an initial signal or a reservation signal during a time interval 780.

When the subframe boundary is matched, the base station 110 may perform remaining transmission of the packet during a time interval 790.

As illustrated in FIG. 7, in the case of the load-based LBT, a subframe boundary and the end point of the ECCA may not match. Therefore, the load-based LBT may need alignment for matching the end point of the ECCA and a subframe boundary.

Figure 8:
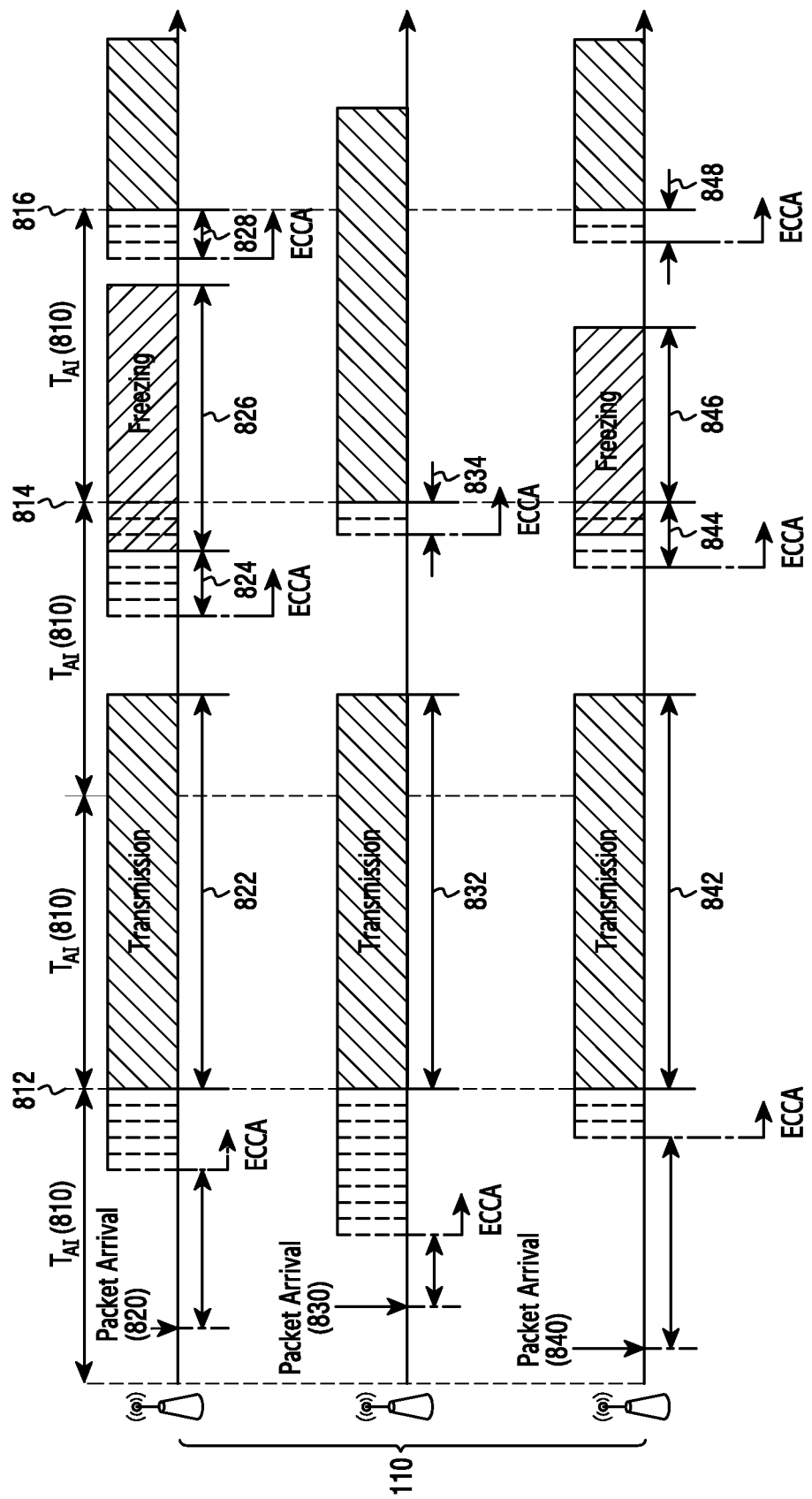
FIG. 8 illustrates an example of a transmission start alignment interval according to various embodiments.

FIG. 8 illustrates an example of a transmission start alignment interval according to various embodiments.

Referring to FIG. 8, the base station 110 may indicate a group of a plurality of base stations that share a frequency band. The base station 110 that shares a frequency band (i.e., frequency reuse-1) may operate according to a transmission start alignment interval, such as a time interval 810. The transmission start alignment interval may be a time interval for matching the end point of ECCA and a transmission start point. The base station 110 that uses the transmission start alignment interval may match the end point of ECCA and a transmission start point, such as a point 812, a point 814, and a point 816.

At a point 820, the base station 110 may receive a packet. In response to the reception of the packet, the base station 110 may perform ECCA including 5 CCAs (i.e., 5 is an integer randomly selected from among integers in a range from 1 to q). The base station 110 may align the end point of the ECCA including 5 CCAs with the start point (or end point) of a transmission start alignment interval, as shown at the point 812. When a CCA count is decreased from 5 to 0, the base station 110 may initiate transmission without performing a procedure of occupying an unlicensed band through an initial signal or a reservation signal (i.e., a procedure of matching a subframe boundary and the end point of the ECCA). The base station 110 may transmit the packet during a time interval 822. When the transmission of the packet is not completed during the time interval 822 (i.e., when the time interval 822 is a maximum of COT((13/32)× q)), the base station 110 may perform ECCA including 7 CCAs (7 is an integer randomly selected from among integers in a range from 1 to q) in order to complete the transmission of the packet. The base station 110 may align the end point of the ECCA including 7 CCAs with the start point (or end point) of a transmission start alignment interval, as shown at the point 814. When the base station 110 determines that another apparatus (e.g., the base station 310) that uses the unlicensed band does not exist during a time interval 824, the base station 110 may decrease the CCA count by 4. The base station 110 may detect that another apparatus uses the unlicensed band at a $5^{th}$ CCA included in the ECCA. In response to the fact that the other apparatus uses the unlicensed band, the base station 110 waits until the occupancy of the unlicensed band by the other apparatus is released during a time interval 826. That is, the base station 110 may perform freezing during the time interval 826. The base station 110 may perform the ECCA including 3 remaining CCAs in order to complete the transmission of the packet. The base station 110 may align the end point of the ECCA including 3 remaining CCAs with the start point (or end point) of a transmission start alignment interval, as shown at the point 816. The base station 110 may decrease the CCA count to 0 during a time interval 828. Since the CCA count becomes 0, the base station 110 may resume the transmission of the packet.

At a point 830, the base station 110 may receive a packet. The base station 110 may perform ECCA including 9 CCAs in response to the reception of the packet. The base station 110 may align the end point of the ECCA including 9 CCAs with the start point (or end point) of a transmission start alignment interval, as shown at the point 812. When a CCA count is decreased from 9 to 0, the base station 110 may initiate transmission without performing a procedure of occupying an unlicensed band through an initial signal or a reservation signal (i.e., a procedure of matching a subframe boundary and the end point of the ECCA). The base station 110 may transmit the packet during a time interval 832. When the transmission of the packet is not completed during the time interval 832 (i.e., when the time interval 832 is a maximum of COT((13/32)×q)), the base station 110 may perform ECCA including 2 CCAs in order to complete the transmission of the packet. The base station 110 may align the end point of the ECCA including 2 CCAs with the start point (or end point) of a transmission start alignment interval, as shown at the point 814. When the base station 110 determines that another apparatus (e.g., the base station 310) that uses the unlicensed band does not exist during a time interval 834, the base station 110 may decrease the CCA count to 0. When the CCA count becomes 0, the base station 110 may resume the transmission of the packet.

At a point 840, the base station 110 may receive a packet. The base station 110 may perform ECCA including 3 CCAs in response to the reception of the packet. The base station 110 may align the end point of the ECCA including 3 CCAs with the start point (or end point) of a transmission start alignment interval, as shown at the point 812. When a CCA count is decreased from 3 to 0, the base station 110 may resume transmission without performing a procedure of occupying the unlicensed band through an initial signal or a reservation signal. The base station 110 may transmit the packet during a time interval 842. When the transmission of the packet is not completed during the time interval 842 (i.e., when the time interval 842 is a maximum of COT((13/32)× q)), the base station 110 may perform ECCA including 4 CCAs in order to complete the transmission of the packet. The base station 110 may align the end point of the ECCA including 4 CCAs with the start point (or end point) of a transmission start alignment interval, as shown at the point 814. When the base station 110 determines that another apparatus (e.g., the base station 310) that uses the unlicensed band does not exist during a time interval 844, the base station 110 may decrease the CCA count by 2. The base station 110 may detect that another apparatus uses the unlicensed band at a $3^{rd}$ CCA included in the ECCA. In response to the use of the unlicensed band by the other apparatus, the base station 110 may perform a freezing operation during a time interval 846. The base station 110 may perform the ECCA including 2 remaining CCAs in order to complete the transmission of the packet. The base station 110 may align the end point of the ECCA including 2 remaining CCAs with the start point (or end point) of a transmission start alignment interval, as shown at the point 816. The base station 110 may decrease the CCA count to 0 during a time interval 848. When the CCA count becomes 0, the base station 110 may resume the transmission of the packet.

Figure 9:
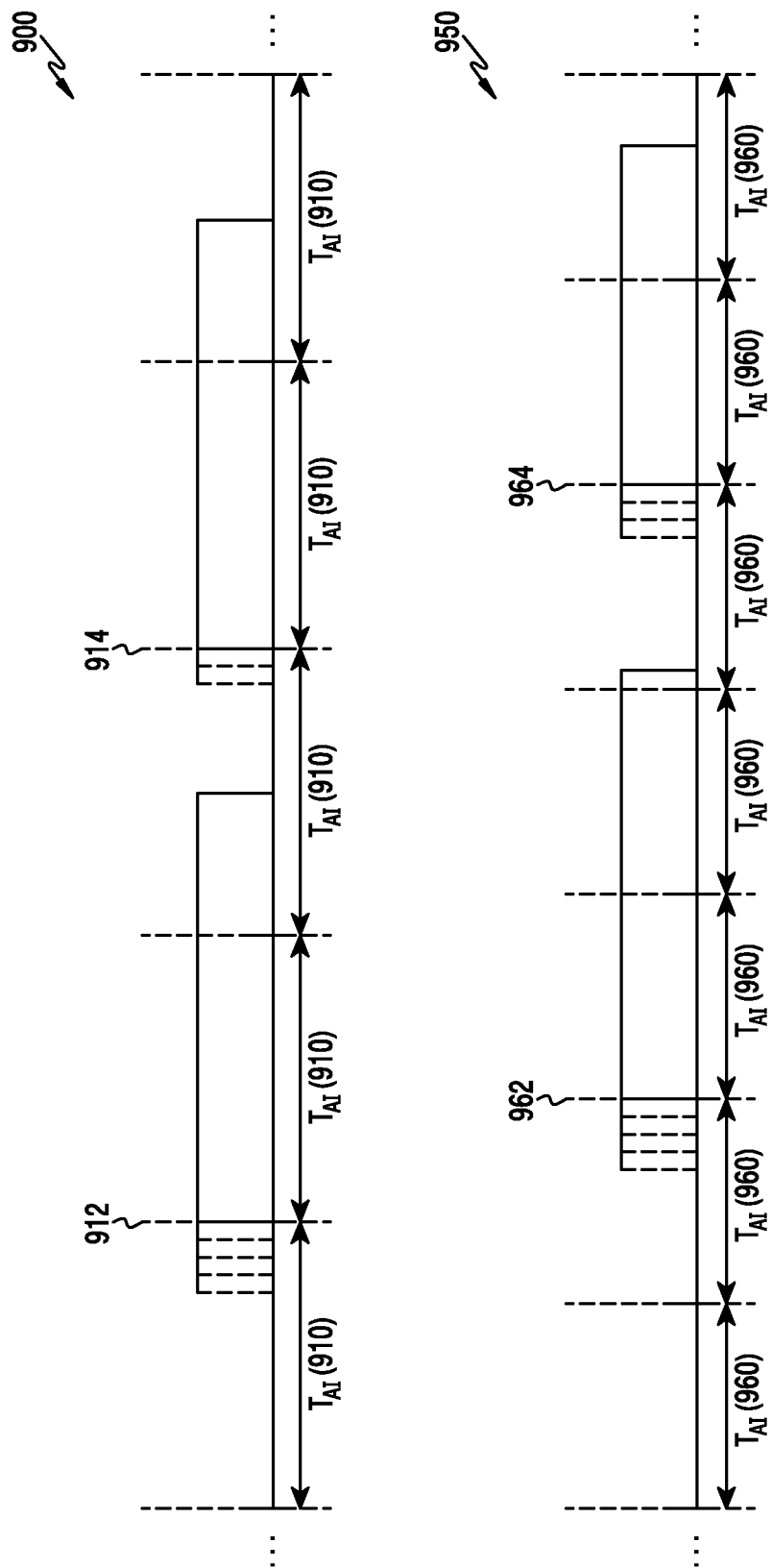
FIG. 9 illustrates an example of adaptively controlling a transmission start alignment interval according to various embodiments.

FIG. 9 illustrates an example of adaptively controlling a transmission start alignment interval according to various embodiments.

Referring to FIG. 9, in a time resource conceptual diagram 900, the base station 110 may operate according to a transmission start alignment interval such as a time interval 910. The base station that uses the transmission start alignment interval may align the end point of ECCA including 4 CCAs with the start point (or end point) of the transmission start alignment interval (matching the end point of the ECCA to a transmission start point) as shown at a point 912. When a CCA count is decreased from 4 to 0, the base station 110 may initiate transmission. The base station 110 may align the end point of ECCA including 2 CCAs with the start point (or end point) of a transmission start alignment interval, as shown at a point 914, in order to transmit a new packet or to complete a previously performed transmission. When a CCA count is decreased from 2 to 0, the base station 110 may initiate transmission.

In the time resource conceptual diagram 950, the base station 110 may operate according to a transmission start alignment interval such as a time interval 960. The transmission start alignment interval may be an interval including a period of time shorter than the time interval 910 (e.g., the transmission start alignment interval in the time resource conceptual diagram 900). The base station 110 according to various embodiments may control a transmission start alignment interval according to communication throughput of another system (e.g., communication throughput of the bases station 310 and the terminal 320 of FIG. 3) that shares an unlicensed band (or frequency band). When the transmission start alignment interval is set to be long, the other system that shares the frequency band (or unlicensed band) with the base station 110 may be provided with a larger number of transmission opportunities. Unlike the above, when the transmission start alignment interval is set to be short, the other system that shares the frequency band (or unlicensed band) with the base station 110 may be provided with a smaller number of transmission opportunities. For example, when the communication throughput of the base station 310 and the terminal 320 is low, the base station 110 according to various embodiments may set the transmission start alignment interval to be short, like the time interval 960. Unlike the above, when the communication throughput of the base station 310 and the terminal 320 is high, the base station 110 according to various embodiments may set the transmission start alignment interval to be long, like the time interval 910. In the time resource conceptual diagram 950, the base station 110 may match the end point of ECCA including 4 CCAs to the start point (or end point) of a transmission start alignment interval, as shown at a point 962. The base station 110 may match the end point of the ECCA including 3 CCAs to the start point (or end point) of a transmission start alignment interval, as shown at a point 964.

Figure 10:
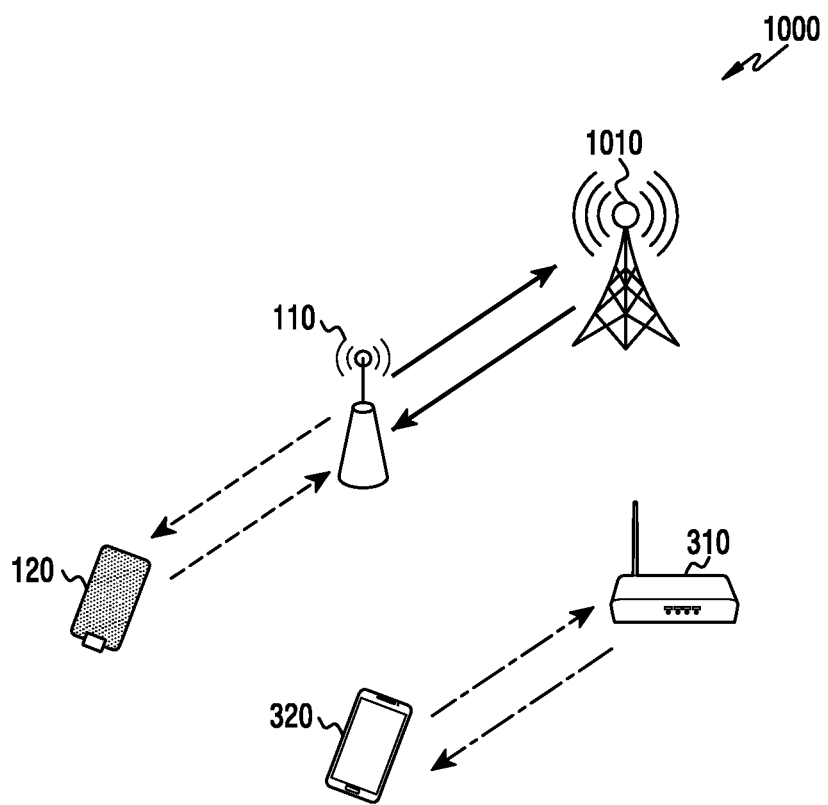
FIG. 10 illustrates an example in which two communication services are provided in a network where two different communication systems coexist according to various embodiments.

FIG. 10 illustrates an example in which two communication services are provided in a network where two different communication systems coexist according to various embodiments.

Referring to FIG. 10, a network 1000 may include the base station 110 of FIG. 1, the terminal 120 of FIG. 1, the base station 310 of FIG. 3, the terminal 320 of FIG. 3, and a master base station 1010. Although FIG. 10 illustrates the base station 110 as a single base station, the base station 110 may indicate a plurality of base stations adjacent to the base station 1010. The base station 110 and the base station 310 may provide different communication services. The base station 110 and the base station 1010 may provide the same communication service. The terminal 120, the base station 310, and the terminal 320 may be located the coverage area of the base station 110.

The base station 110 and the base station 1010 may be base stations that service LTE-U. The base station 110 and the base station 1010 may be base stations for the first system 301 of FIG. 3. The base station 110 may be referred to as a sub-base station. The base station 1010 may be referred to as a master base station. The terminal 120 may be a terminal that communicates with the base station 110. The terminal 120 may be a terminal for the first system 301.

The base station 310 may be a base station that services WLAN. The base station 310 may be a base station for the second system 302 of FIG. 3. The terminal 320 may be a terminal that communicates with the base station 310. The terminal 320 may be a terminal for the second system 302.

The base station 110, the terminal 120, the base station 310, the terminal 320, and the base station 1010 may share the same frequency band. The base station 110 may perform energy detection. For example, the base station 110 may recognize a signal transmitted or received by the base station 310 using the same frequency band, and a signal transmitted or received by the terminal 320, through the energy detection. The base station 110 may utilize a frequency band based on the recognized information.

The base station 110 may communicate with the base station 1010. The base station 110 may transmit information related to the base station 310 and/or the terminal 320 to the base station 1010. The information associated with the base station 310 and/or the terminal 320 may be obtained through an energy detection operation of the base station 110. The base station 1010 may receive, from the base station 110, the information related to the base station 310 or the terminal 320. The base station 1010 may determine a transmission start alignment interval based on the received information related to the base station 310 and/or the terminal 320. The base station 1010 may transmit, to the base station 110, information associated with the determined transmission start alignment interval. The base station 110 may communicate with the terminal 120 based on the received information associated with the transmission start alignment interval.

Figure 11:
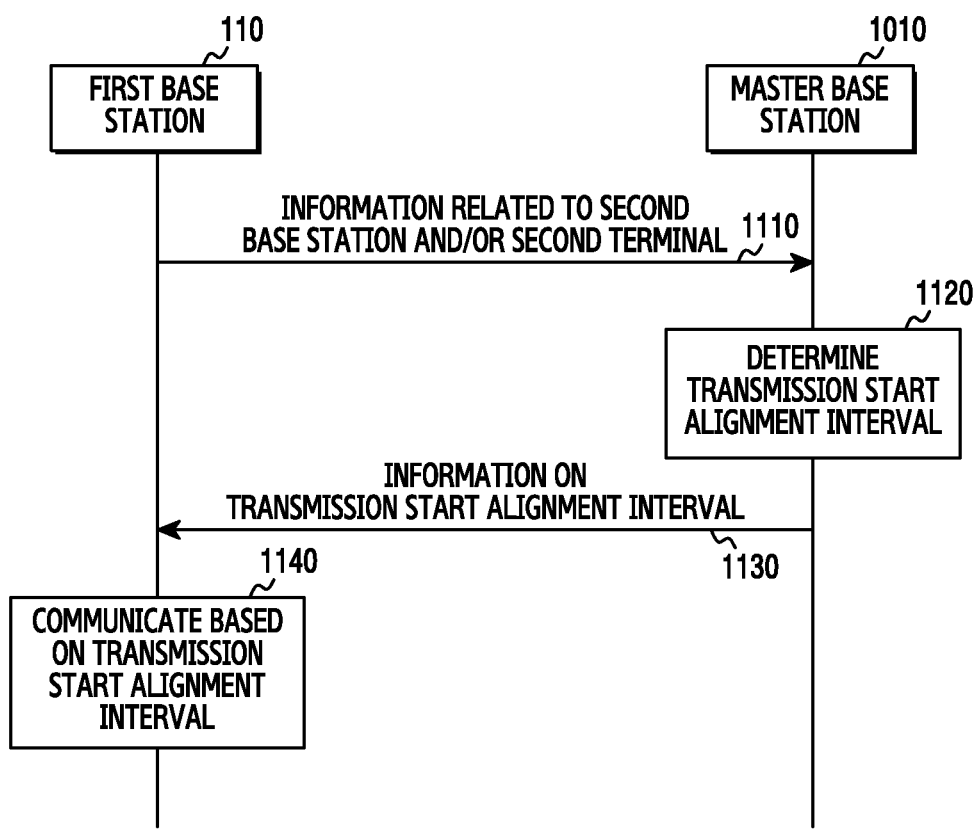
FIG. 11 is a flowchart illustrating operation of a first base station and a master base station according to various embodiments.

FIG. 11 is a flowchart illustrating operation of a first base station and a master base station according to various embodiments. Such operational flow may be performed by the base station 110 of FIG. 1 and the base station 1010 of FIG. 10.

Referring to FIG. 11, the base station 110 may be referred to as a first base station. The first base station 110 may indicate a plurality of base stations. The first base station 110 may be a base station located in a place adjacent to the master base station 1010. The first base station 110 and the master base station 1010 may be included in the first system 301 of FIG. 3. The first system 301 may be a system that services LTE-U. Although not illustrated in FIG. 11, the first base station 110 and the master base station 1010 may provide a service to a terminal. For example, the first base station 110 and/or the master base station 1010 may provide a service to the terminal 120 illustrated in FIG. 1.

A second base station may be the base station 310 of FIG. 3. A second terminal may be the terminal 320 of FIG. 3. The second base station may provide a service to the second terminal. The second base station and the second terminal may be included in the second system 302 of FIG. 3. The second system 302 may be a system that services WLAN.

In operation 1110, the first base station 110 may transmit information associated with the second base station and/or second terminal to the master base station 1010. The information associated with the second base station and/or the second terminal may be information related to communication capacity of the second base station and/or the second terminal. For example, the information associated with the second base station and/or the second terminal may be traffic load. The first base station may recognize information associated with the second base station and/or second terminal through energy detection or the like.

In operation 1120, the master base station 1010 may determine a transmission start alignment interval based on the received information related to the second base station and/or the second terminal. For example, when it is determined that a relatively large traffic load of the second base station and/or second terminal exists, the master base station 1010 may determine the transmission start alignment interval to be relatively long in order to provide a relatively large number of transmission opportunities to the second base station and/or the second terminal. When it is determined that a relatively small traffic load of the second base station and/or second terminal exists, the master base station 1010 may determine the transmission start alignment interval to be relatively short in order to provide a relatively large number of transmission opportunities to the first base station 110 and/or the master base station 1010.

In operation 1130, the master base station 1010 may transmit the determined transmission start alignment interval to the first base station 110.

In operation 1140, the first base station 110 may communicate with the terminal 120 of FIG. 1 based on the received transmission start alignment interval. Also, although not illustrated in FIG. 11, the master base station 1010 may perform communication based on the transmission start alignment interval.

Figure 12:
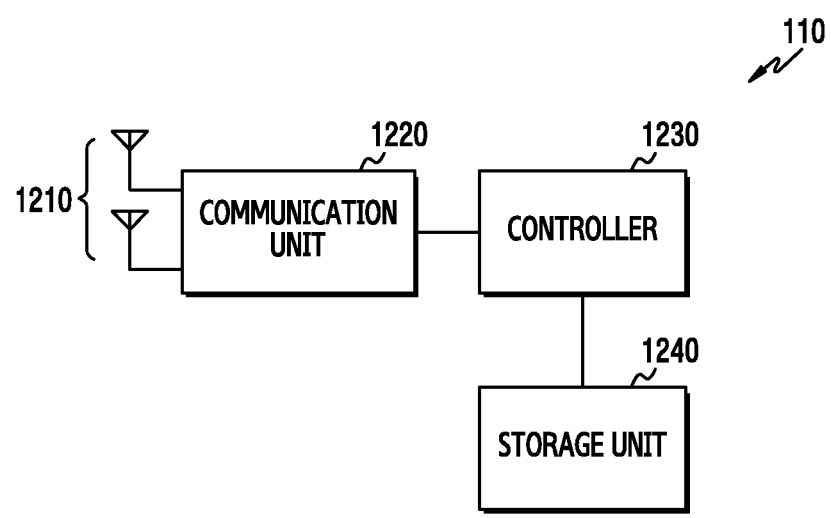
FIG. 12 is a functional block diagram of a first base station according to various embodiments.

FIG. 12 illustrates a functional block diagram of a first base station according to various embodiments. The functional block diagram may be included in the base station 110 of FIG. 1. The base station 110 may be referred to as the first base station 110.

Referring to FIG. 12, the first base station 110 may include an antenna 1210, a communication unit 1220, a control unit 1230, and a storage unit 1240.

The antenna 1210 may include one or more antennas. Also, the antenna 1210 may be configured to be appropriate for multi-input multi-output (MIMO).

The communication unit 1220 may perform functions for transmitting a signal through a wireless channel. For example, the communication unit 1220 may perform converting between a baseband signal and a bit stream according to a physical layer standard of a system. For example, when data is transmitted, the communication unit 1220 may encode and modulate a transmission bit stream so as to generate complex symbols. Also, when data is received, the communication unit 1220 may decode and demodulate a baseband signal so as to restore a reception bit stream. The communication unit 1220 may up-convert a baseband signal to an RF band signal, and may transmit the same through an antenna 1210. The communication unit 1220 may down-convert an RF band signal received through the antenna 1210 into a base band signal. For example, the communication unit 1220 may include a transmission filter, a reception filter, an amplifier, a mixer, and an oscillator, a Digital Analog Converter (DAC), an Analog Digital Converter (ADC), and the like. The communication unit 1220 may also be referred to as a transmitting unit, a receiving unit, or a transceiving unit, as needed.

The controller 1230 may control operation of the first base station 110. For example, the controller 1230 may transmit and receive a signal through the communication unit 1220. The controller 1230 may record data in the storage unit 1240, and may read data recorded in the storage unit 1240. To this end, the controller 1230 may include at least one processor. For example, the controller 1230 may include a communication processor (CP) that performs control for communication, and an application processor (AP) that controls a higher layer such as an application program or the like.

The controller 1230 may perform energy detection. The controller 1230 may detect whether energy exists in resources used by the base station 310 or the terminal 320 (e.g., in an unlicensed band or frequency band shared with the first base station 110). The base station 310 may be referred to as the second base station 310. The terminal 320 may be referred to as the second terminal 320.

The controller 1230 may calculate the average traffic load of the second base station 310 and/or the second terminal 320 through the energy detection. The controller 1230 may measure the current traffic load of the second base station 310 and/or the second terminal 320 through the energy detection. The controller 1230 may calculate the average traffic load of the second base station 310 and/or the second terminal 320 based on the current traffic load and previously calculated average traffic load. The controller 1230 may calculate the average traffic load of the second base station 310 and/or the second terminal 320 using Equation 1 provided below.

$$B_i[n] = \frac{1}{T_W} \cdot b_i[n] + \left(1 - \frac{1}{T_W}\right) \cdot B_i[n-1] \quad \text{Equation 1}$$

In Equation 1, $b_i[n]$ may be the current traffic load of the second base station 310 and/or the second terminal 320, which is measured based on the energy detection at an $n^{th}$ subframe. In Equation 1, $T_W$ denotes a time interval during which energy detection is performed with respect to a frequency band (or unlicensed band) that the first base station 110 shares with the second base station 310 and/or the second terminal 320. That is, the controller 1230 may perform energy detection with respect to the $n^{th}$ subframe during $T_W$, thereby measuring the current traffic load of the second base station 310 and/or the second terminal 320. $T_W$ may vary according to the configuration of the first base station 110. For example, the first base station 110 may set $T_W$ to be relatively long in order to more accurately measure the current traffic load of the second base station 310 and/or the second terminal 320. In Equation 1, $B_i[n-1]$ may be the average traffic load of the second base station 310 and/or the second terminal 320 up to an $n-1^{th}$ subframe. When the calculated average traffic load does not exist (i.e., when the average traffic load of a first subframe is calculated), the value of $B_i[n-1]$ may be 0.

The controller 1230 may transmit information on the calculated average traffic load of the second base station 310 and/or the second terminal 320 to the master base station 1010 or the like through the communication unit 1220.

The controller 1230 may obtain the current traffic load of the first base station 110 through a buffer. Although not illustrated in FIG. 12, the buffer may be included in one of the communication unit 1220, the controller 1230, and the storage unit 1240. The controller 1230 may detect whether a packet exists in the buffer. For example, the controller 1230 may indicate the case in which a packet exists in the buffer at a $K^{th}$ slot, using 1. The controller 1230 may indicate the case in which a packet does not exist in the buffer at the $K^{th}$ slot, using 0. The controller 1230 may perform detection in the buffer during $T_W$. The current traffic load of the first base station 110 measured by the controller 1230 may be referred to as a buffer occupancy (BO) value.

The controller 1230 may calculate the average traffic load of the first base station 110 based on the measured current traffic load of the first base station 110.

The controller 1230 may transmit information associated with the calculated average traffic load of the first base station 110 to the master base station 1010 or the like through the communication unit 1220.

The storage unit 1240 may store data, such as a basic program, an application program, configuration information, and the like for operating the first base station 110. Particularly, the storage unit 1240 may store a codebook for feeding back channel information or the like. The storage unit 1240 may provide data stored therein in response to a request from the controller 1230.

Through the block diagram illustrated in FIG. 12, the first base station 110 may communicate with the terminal 120 or the like according to a transmission start alignment interval received from the master base station 1010.

Figure 13:
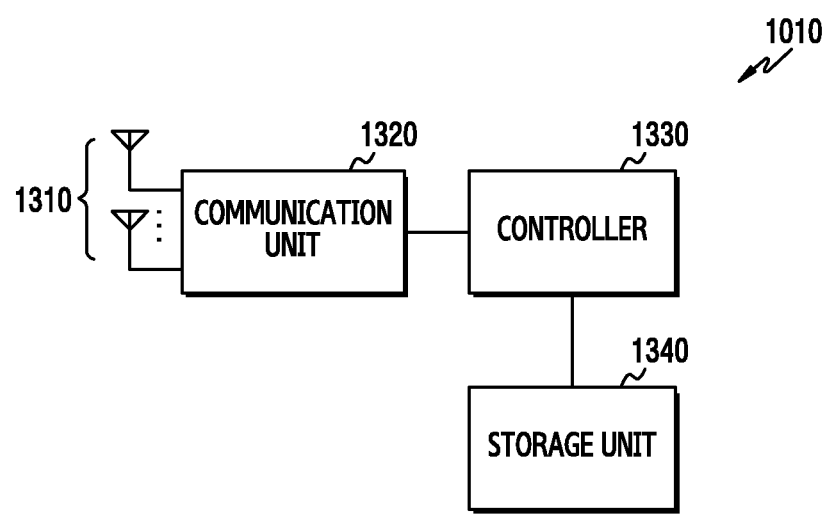
FIG. 13 is a functional block diagram of a master base station according to various embodiments.

FIG. 13 illustrates a functional block diagram of a master base station according to various embodiments. The functional block diagram may be included in the base station 1010 of FIG. 10. The base station 1010 may be referred to as the master base station 1010.

Referring to FIG. 13, the master base station 1010 may include an antenna 1310, a communication unit 1320, a controller 1330, and a storage unit 1340.

The antenna 1310 may include one or more antennas. Also, the antenna 1310 may be configured to be appropriate for multi-input multi-output (MIMO).

The communication unit 1320 may perform functions for transmitting a signal through a wireless channel. For example, the communication unit 1320 may perform converting between a baseband signal and a bit stream according to a physical layer standard of a system. For example, when data is transmitted, the communication unit 1320 may encode and modulate a transmission bit stream so as to generate complex symbols. Also, when data is received, the communication unit 1320 may decode and demodulate a baseband signal so as to restore a reception bit stream. The communication unit 1320 may up-convert a baseband signal to an RF band signal, and may transmit the same through an antenna 1310. The communication unit 1320 may down-convert an RF band signal received through the antenna 1310 into a base band signal. For example, the communication unit 1320 may include a transmission filter, a reception filter, an amplifier, a mixer, and oscillator, a Digital Analog Converter (DAC), an Analog Digital Converter (ADC), and the like. The communication unit 1320 may also be referred to as a transmitting unit, a receiving unit, or a transceiving unit, as needed.

The controller 1330 may control operation of the master base station 1010. For example, the controller 1330 may transmit and receive a signal through the communication unit 1320. The controller 1330 may record data in the storage unit 1340, and may read data recorded in the storage unit 1340. To this end, the controller 1330 may include at least one processor. For example, the controller 1330 may include a Communication Processor (CP) that performs control for communication, and an Application Processor (AP) that controls a higher layer such as an application program.

The controller 1330 may receive information associated with the average traffic load of the base station 310 and/or terminal 320 from the base station 110 or the like, through the communication unit 1320.

The controller 1330 may calculate the average traffic load of a heterogeneous system (e.g., the second system 302) that shares a frequency band (or unlicensed band) based on the average traffic load of the base station 310 and/or the terminal 320. The controller 1330 may calculate the average traffic load $B_{avg}[n]$ of the second system 302 using Equation 2 provided below.

$$B_{avg}[n] = \frac{1}{N} \sum_{i=1}^{N} B_i[n] \quad \text{Equation 2}$$

In Equation 2, $B_i[n]$ may be the average traffic load of the base station 310 and/or the terminal 320 up to an $n^{th}$ subframe. N may indicate the number of the base stations 110. That is, N may indicate the number of base stations that share a frequency band (frequency reuse group).

The controller 1330 may determine a transmission start alignment interval based on the average traffic load calculated through Equation 2. For example, when it is determined that the calculated average traffic load is large, the controller 1330 may determine the transmission start alignment interval to be relatively long. When it is determined that the calculated average traffic load is small, the controller 1330 may determine the transmission start alignment interval to be relatively short.

When the average traffic load of the first base station 110 is received, the controller 1330 may determine the transmission start alignment interval based on the average traffic load of the first base station 110 and the average traffic load of the second base station 310 and/or the second terminal 320.

The controller 1330 may calculate the average traffic load of the first system 301 based on the received average traffic load of the first base station 110. The controller 1330 may calculate the average traffic load of the second system 302 based on the received average traffic load of the second base station 310 and/or the second terminal 320.

The controller 1330 may determine the transmission start alignment interval based on the calculated average traffic load of the first system 301 and the calculated average traffic load of the second system 302. Unlike the case that takes into consideration the traffic load of the second base station 310 and/or the second terminal 320, the transmission start alignment interval may include a time interval determined by the first system 301 and a time interval determined by the second system 302.

The controller 1330 may determine the transmission start alignment interval to linearly correspond to the traffic load of the second system. Also, the controller 1330 may determine the transmission start alignment interval to have a predetermined value when the traffic load of the second system is in a predetermined range.

The controller 1330 may transmit information associated with the calculated transmission start alignment interval to the base station 110 or the like through the communication unit 1320.

The storage unit 1340 may store data, such as a basic program, an application program, configuration information, and the like for operating the master base station 1010. Particularly, the storage unit 1340 may store a codebook for feeding back channel information or the like. The storage unit 1340 may provide data stored therein in response to a request from the controller 1330.

Through the block diagram of FIG. 13, the master base station 1010 may determine a transmission start alignment interval, and may perform communication according to the transmission start alignment interval.

Figure 14:
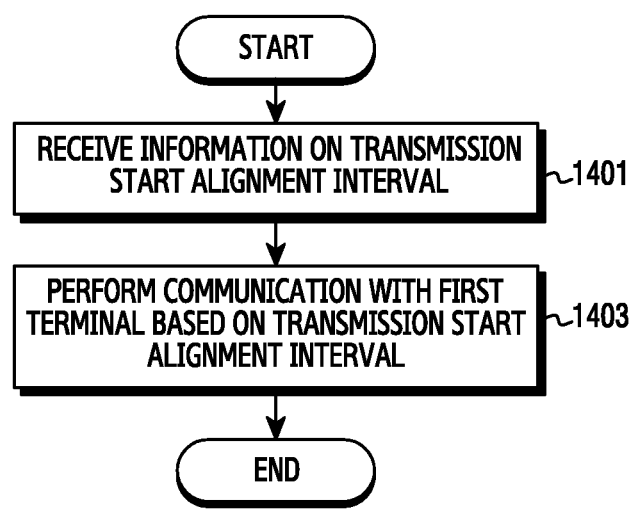
FIG. 14 is a flowchart illustrating operation of a first base station according to various embodiments.

FIG. 14 is a flowchart illustrating operation of a first base station according to various embodiments. The operational flow may be performed by the first base station 110 of FIG. 1.

Referring to FIG. 14, the first base station 110 may be a base station for the first system 301 of FIG. 3. The first terminal may be a terminal for the first system 301 of FIG. 3. The first terminal may be the terminal 120 of FIG. 1. The terminal 120 may be referred to as the first terminal 120.

In operation 1401, the first base station 110 may receive information associated with a transmission start alignment interval. The transmission start alignment interval may be determined based on information related to a base station and/or terminal of a heterogeneous system that shares a frequency band. For example, the transmission start alignment interval may be determined based on information related to the second base station 310 and/or the second terminal 320 of the second system 302 of FIG. 3 that shares a frequency band (e.g., an unlicensed band) with the first system 301. The transmission start alignment interval may be a transmission start alignment interval determined by the master base station 1010 or the like. The operation in operation 1401 may be performed by one or more of the communication unit 1220 and the controller 1230 of FIG. 12.

In operation 1403, the first base station 110 may communicate with the first terminal 120 based on the transmission start alignment interval. The first base station 110 may match the end point of ECCCA and a transmission start point based on the transmission start alignment interval. The operation in operation 1403 may be performed by the controller 1230 of FIG. 12.

Through operations in operations 1401 to 1403, the first base station 110 may perform communication based on the transmission start alignment interval, whereby the performance of the second system 302 is maintained and improved communication capacity may be secured. The base station 110 may improve the throughput of the whole system including the first system 301 and the second system 302 through the transmission start alignment interval.

Figure 15:
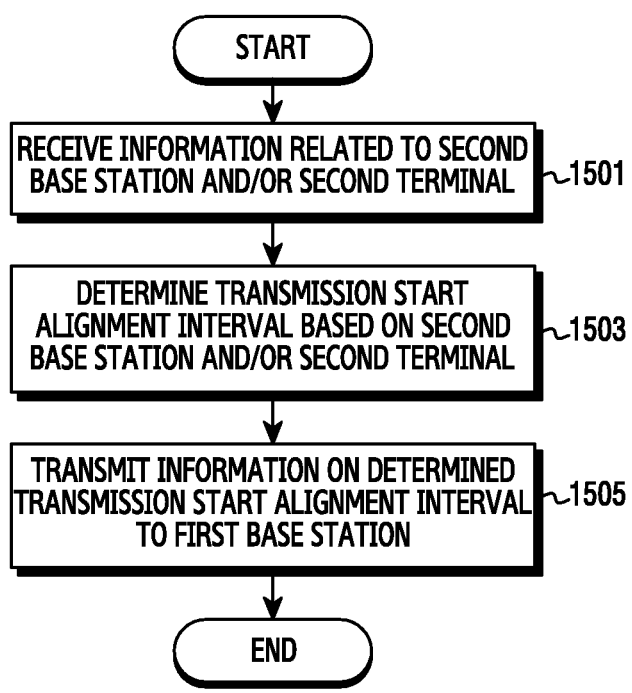
FIG. 15 is a flowchart illustrating operation of a master base station according to various embodiments.

FIG. 15 is a flowchart illustrating operation of a master base station according to various embodiments. The operational flow may be performed by the master base station 1010 of FIG. 10.

Referring to FIG. 15, the master base station 1010 may be a base station for the first system 301 of FIG. 3. A first base station may be the base station 110 of FIG. 1. The base station 110 may be referred to as the first base station 110. The first base station 110 may be a base station for the first system 301 of FIG. 3.

A second base station may be the base station 310 of FIG. 3. The base station 310 may be referred to as the second base station 310. The second base station 310 may be a base station for the second system 302 of FIG. 3. A second terminal may be the terminal 320 of FIG. 3. The terminal 320 may be referred to as the second terminal 320. The second terminal 320 may be a base station for the second system 302 of FIG. 3.

In operation 1501, the master base station 1010 may receive information associated with the second base station 310 and/or second terminal 320 from a base station (e.g., the first base station 110) that shares a frequency band (e.g., unlicensed band). The information associated with the second base station 310 and/or the second terminal 320 may be information related to communication capacity of the second base station 310 and/or the second terminal 320. For example, the information associated with the second base station 310 and/or the second terminal 320 may be traffic load. The operation in operation 1501 may be performed by one or more of the communication unit 1320 and the controller 1330 of FIG. 13.

In operation 1503, the master base station 1010 may determine a transmission start alignment interval based on the information related to the second base station 310 and/or the second terminal 320. For example, when the amount of traffic load of the second base station 310 and/or the second terminal 320 is large, the master base station 1010 may determine the transmission start alignment interval to be relatively long. When the amount of traffic load of the second base station 310 and/or the second terminal 320 is small, the master base station 1010 may determine the transmission start alignment interval to be relatively short. The operation in operation 1503 may be performed by the controller 1330 of FIG. 13.

In operation 1505, the master base station 1010 may transmit the determined transmission start alignment interval to the first base station 110. Although not illustrated in FIG. 15, the master base station 1010 may perform communication based on the determined transmission start alignment interval. The first base station 110 may receive information associated with the determined transmission start alignment interval. The first base station 110 may match the end point of ECCA and a transmission start point based on the received transmission start alignment interval. In other words, the first base station 110 may match the start point (or end point) of the received transmission start alignment interval to the end point of the ECCA. The operation in operation 1505 may be performed by one or more of the communication unit 1320 and the controller 1330 of FIG. 13.

By performing the operations in operations 1501 to 1505, the master base station 1010 may match a transmission start point and the end point of ECCA of the base station 110 (i.e., a base station group that shares a frequency band (e.g., unlicensed band)) and the master base station 1010. Also, the master base station 1010 may control the length of the transmission start alignment interval according to communication capacity (e.g., traffic load) of one or more of the second base station 310 and the second terminal 320. The master base station 1010 may secure improved communication capacity by maintaining the performance of the second system 302 through control of the transmission start alignment interval. That is, the master base station 1010 may improve the throughput of the whole system including the first system 301 and the second system 302 through the control of transmission start alignment interval.

Figure 16:
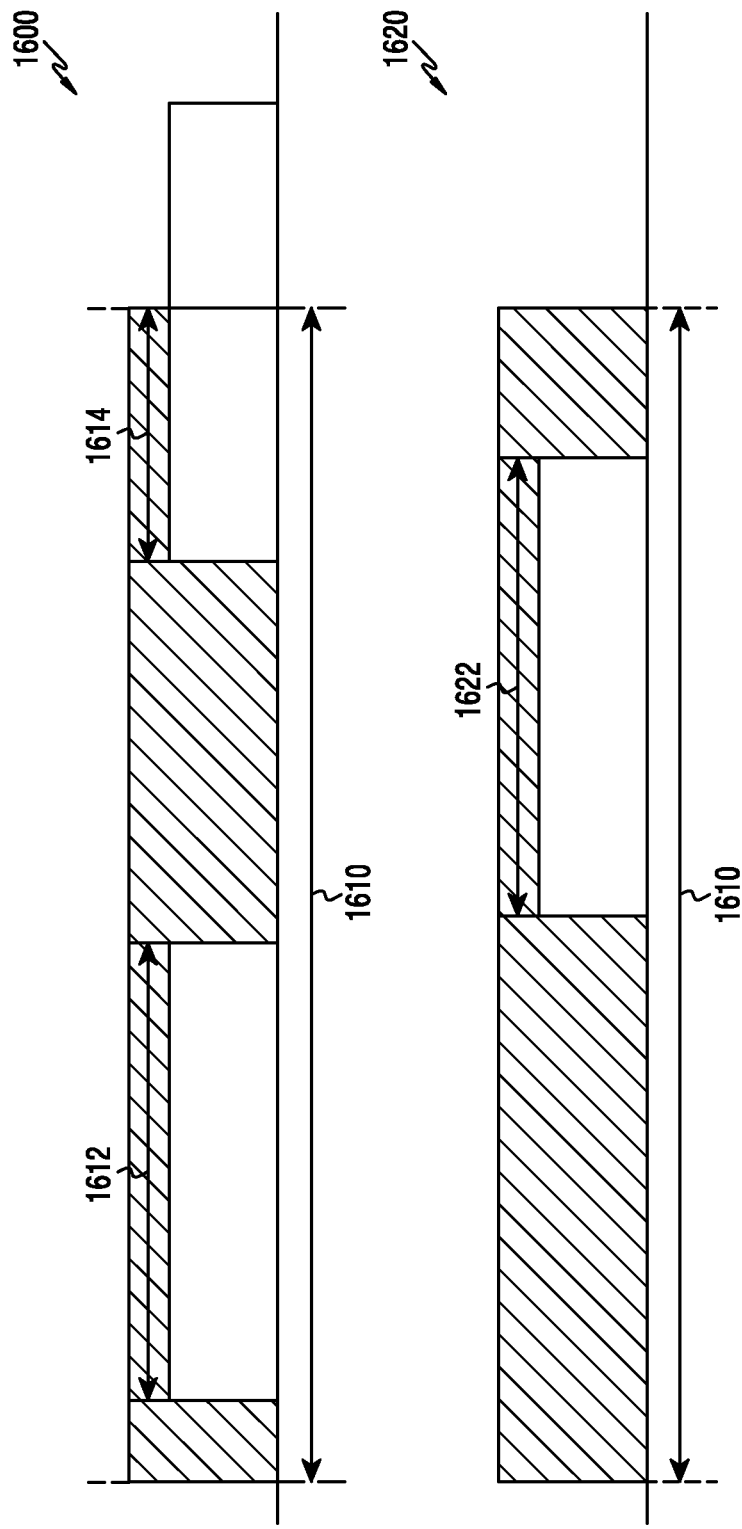
FIG. 16 is a time resource conceptual diagram illustrating operation of a base station that performs energy detection with respect to a heterogeneous system according to a first embodiment.

FIG. 16 is a time resource conceptual diagram illustrating operation of a base station that performs energy detection with respect to a heterogeneous system according to a first embodiment. Such operation may be performed by the first base station 110 of FIG. 1.

Referring to FIG. 16, the first base station 110 may perform energy detection with respect to a frequency band (e.g., unlicensed band) using the second base station 310 and/or the second terminal 320 during a time interval 1610, as shown in a time resource conceptual diagram 1600. The time interval 1610 may indicate a time during which the first base station 110 performs energy detection. The time interval 1610 may vary according to the configuration of the first base station 110. For example, when traffic load of the second base station 310 and/or second terminal 320 needs to be measured accurately, the first base station 110 may set the time interval 1610 to be relatively long. Unlike the above, when traffic load of the second base station 310 and/or second terminal 320 needs to be measured promptly, the first base station 110 may set the time interval 1610 to be relatively short. A time interval 1612 and a time interval 1614 may be time intervals during which the first base station 110 detects energy. The first base station 110 may calculate traffic load of a current subframe based on the energy detection.

As shown in the time resource conceptual diagram 1620, the first base station 110 may perform energy detection with respect to a frequency band that the second base station 310 and/or the second terminal 320 use during the time interval 1610. A time interval 1622 may be a time interval during which the first base station 110 detects energy. The first base station 110 may calculate traffic load at the current subframe based on the energy detection.

Figure 17:
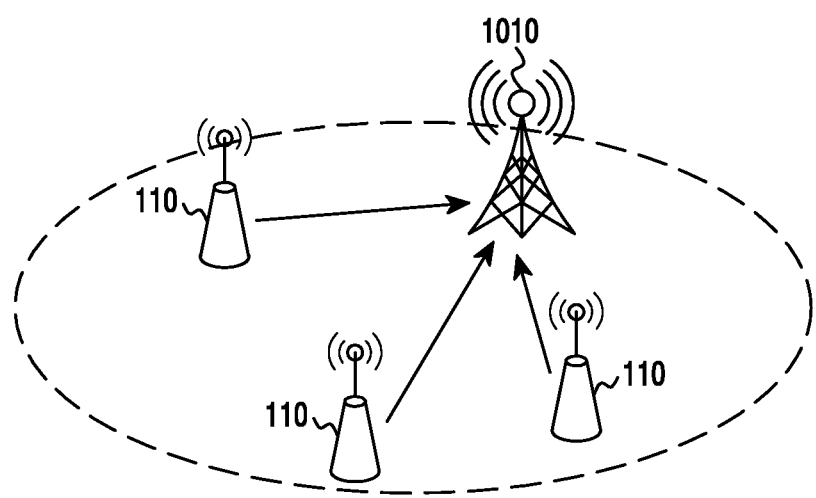
FIG. 17 illustrates a first base station and a master base station that transmit and receive average traffic load according to the first embodiment.

FIG. 17 illustrates a first base station and a master base station that transmit and receive average traffic load according to the first embodiment. Operations of FIG. 17 may be performed by the first base station 110 of FIG. 1 and the master base station 1010 of FIG. 10.

Referring to FIG. 17, the first base station 110 may calculate the average traffic load $B_i[n]$ up to the current subframe based on the traffic load $b_i[n]$ of the current subframe calculated through the operations of FIG. 16. For example, the first base station 110 may use an exponential moving average (EMA) window scheme, so as to calculate the average traffic load $B_i[n]$ up to the current subframe. The first base station 110 may calculate the average traffic load up $B_i[n]$ to the current subframe using $$B_i[n] = \frac{1}{T_W} \cdot b_i[n] + \left(1 - \frac{1}{T_W}\right) \cdot B_i[n-1].$$

n denotes an $n^{th}$ subframe (i.e., the current subframe). $T_W$ denotes a time during which the first base station 110 performs energy detection (e.g., the time interval 1610 of FIG. 16). $B_i[n-1]$ denotes the average traffic load up to an $n-1^{th}$ subframe.

The first base station 110 may transmit the calculated average traffic load $B_i[n]$ up to the current subframe to the master base station 1010. The master base station 1010 may determine a transmission start alignment interval based on the average traffic load $B_i[n]$ up to the current subframe.

Figure 18:
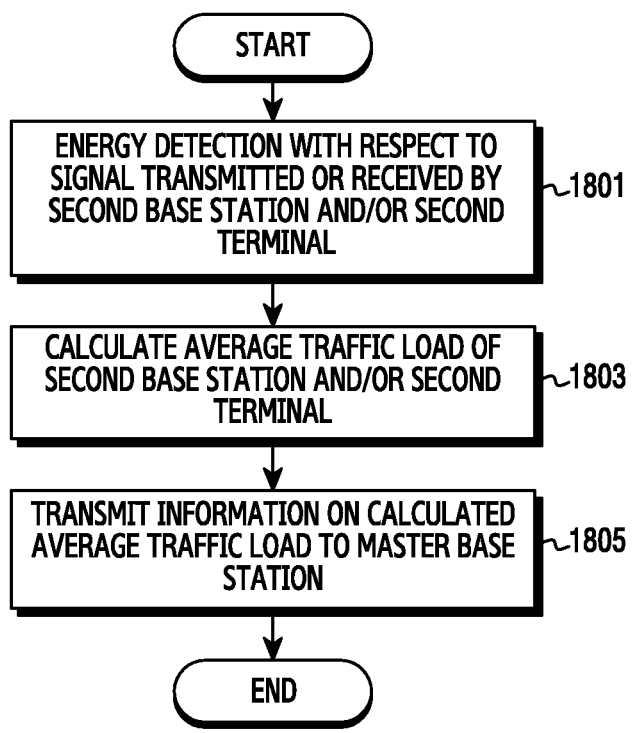
FIG. 18 is a flowchart illustrating operation of a first base station according to the first embodiment.

FIG. 18 is a flowchart illustrating operation of a first base station according to the first embodiment. Such operational flow may be performed by the first base station 110 of FIG. 1.

Referring to FIG. 18, in operation 1801, the first base station 110 may perform energy detection with respect to a transmitted/received signal of the second base station 310 and/or the second terminal 320 of FIG. 3. The second base station 310 and/or the second terminal 320 of FIG. 3 may share a frequency band (e.g., unlicensed band) with the first base station. The first base station 110 may detect energy associated with a signal that the second base station 310 transmits or receives and a signal that the second terminal 320 transmits or received through the frequency band. The fact that the energy is detected may indicate that action of the second base station 310 and/or the second terminal 320 is detected. The first base station 110 may calculate traffic load $b_i[n]$ of the second base station 310 and/or the second terminal 320 at the current subframe (i.e., $n^{th}$ subframe) through the energy detection. The operation in operation 1801 may be performed by one or more of the communication unit 1220 and the controller 1230 of FIG. 12.

In operation 1803, the first base station 110 may calculate the average traffic load $B_i[n]$ of the second base station 310 and/or the second terminal 320 up to the current subframe. For example, the first base station 110 may calculate the average traffic load $B_i[n]$ up to the current subframe using $$B_i[n] = \frac{1}{T_W} \cdot b_i[n] + \left(1 - \frac{1}{T_W}\right) \cdot B_i[n-1].$$

Such operation in operation 1803 may be performed by the controller 1230 of FIG. 12.

In operation 1805, the first base station 110 may transmit information on the calculated average traffic load $B_i[n]$ to the master base station 1010 of FIG. 10 in operation 1803. Such operation in operation 1805 may be performed by one or more of the communication unit 1220 and the controller 1230 of FIG. 12.

Figure 19:
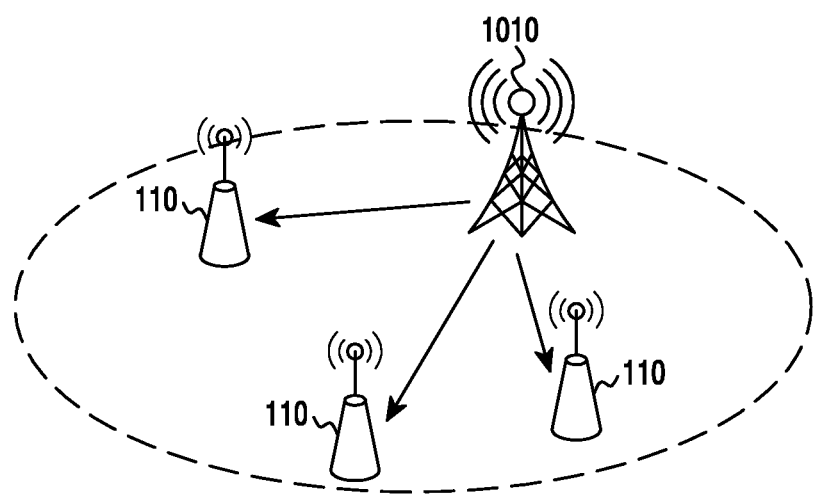
FIG. 19 illustrates a first base station and a master base station that transmit a transmission start alignment interval according to the first embodiment.

FIG. 19 illustrates a first base station and a master base station that transmit a transmission start alignment interval according to the first embodiment. Operations of FIG. 19 may be performed by the first base station 110 of FIG. 1 and the master base station 1010 of FIG. 10.

Referring to FIG. 19, the master base station 1010 may receive information on the average traffic load $B_i[n]$ up to the current subframe from the first base station 110. The master base station 1010 may calculate the average traffic load $B_{avg}[n]$ of the second system 302 up to the current subframe using the average traffic load $B_i[n]$ up to the current subframe. For example, the master base station 1010 may calculate the average traffic load $B_{avg}[n]$ of the second system 302 up to the current subframe through $$B_{avg}[n] = \frac{1}{N} \sum_{i=1}^{N} B_i[n].$$

Although a process of calculating the average traffic load $B_{avg}[n]$ of the second system 302 through an arithmetic mean is illustrated, this is merely an example for the description. Various methods for calculating the average traffic load $B_{avg}[n]$ of the second system 302 will be applied in the present embodiment.

The master base station 1010 may determine a transmission start alignment interval based on the calculated average traffic load $B_{avg}[n]$ of the second system 302 For example, when $B_{avg}[n]$ is calculated to be a relatively high value, the master base station 1010 may determine the transmission start alignment interval to be relatively long. For example, when $B_{avg}[n]$ is calculated to be a relatively low value, the master base station 1010 may determine the transmission start alignment interval to be relatively short.

The master base station 1010 may transmit information on the determined transmission start alignment interval to the first base station 110. Also, the master base station 1010 may perform communication based on the determined transmission start alignment interval. For example, when communication is performed using a frequency band that is shared with the second system 302, the master base station 1010 may match the end point of ECCA to the start point (or end point) of the transmission start alignment interval. The master base station 1010 may initiate transmission that uses the shared frequency band at the end point of the ECCA.

The first base station 110 may receive information associated with the transmission start alignment interval from the master base station 1010. The first base station 110 may communicate with the first terminal 120 or the like based on the determined transmission start alignment interval. For example, when communication is performed using the frequency band that is shared with the second system 302, the first base station 110 may match the end point of ECCA to the start point (or end point) of the transmission start alignment interval. The first base station 110 may initiate transmission that uses the unique frequency band at the end point of the ECCA.

Figure 20:
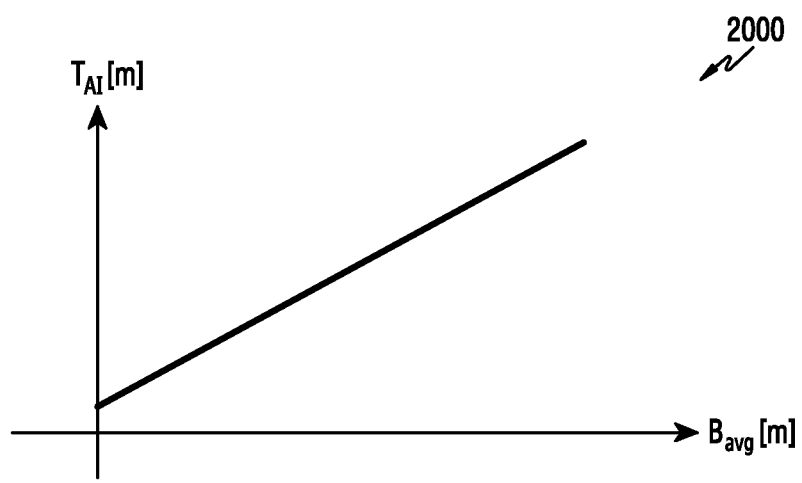
FIG. 20 is a graph illustrating the relationship between a transmission start alignment interval and average traffic load of a second system according to the first embodiment.

FIG. 20 is a graph illustrating the relationship between a transmission start alignment interval and the average traffic load of a second system according to the first embodiment.

Referring to FIG. 20, the horizontal axis of graph 2000 may indicate average traffic load $B_{avg}[n]$ of a second system. The vertical axis of the graph 2000 may indicate a transmission start alignment interval. In the graph 2000, the relationship between the average traffic load $B_{avg}[n]$ of the second system and the transmission start alignment interval $T_{AI}[n]$ may be linear. For example, when the average traffic load $B_{avg}[n]$ of the second system has a high value, the master base station 1010 of FIG. 10 may determine the transmission start alignment interval $T_{AI}[n]$ to be a high value based on the graph 2000. When the average traffic load $B_{avg}[n]$ of the second system has a low value, the master base station 1010 of FIG. 10 may determine the transmission start alignment interval $T_{AI}[n]$ to be a low value. Such operation that determines a transmission start alignment interval may be performed by the controller 1330 of FIG. 13.

Figure 21:
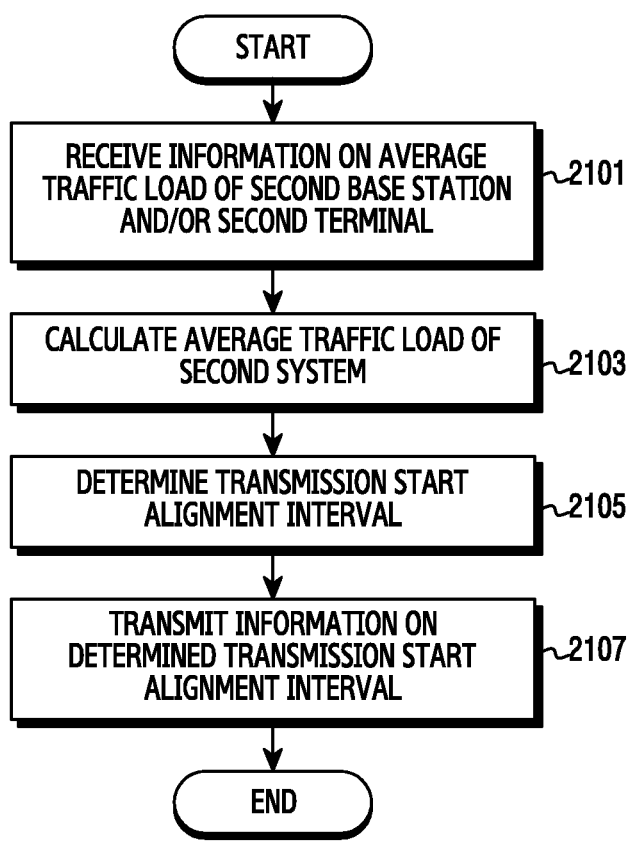
FIG. 21 is a flowchart illustrating operation of a master base station according to the first embodiment.

FIG. 21 is a flowchart illustrating operation of a master base station according to the first embodiment. Such operational flow may be performed by the master base station 1010.

Referring to FIG. 21, in operation 2101, the master base station 1010 may receive information associated with the average traffic load of the second base station 310 and/or the second terminal 320 of FIG. 3 from the first base station 110 of FIG. 1. Such operation in operation 2101 may be performed by one or more of the communication unit 1320 and the controller 1330 of FIG. 13.

In operation 2103, the master base station 1010 may calculate the average traffic load of a second system based on information on the average traffic load $B_i[n]$. For example, the master base station 1010 may calculate the average traffic load $B_{avg}[n]$ of the second system through $B_{avg}[n]=1/N\sum_{i=1}^{N}B_i[n]$. Such operation in operation 2103 may be performed by the controller 1330 of FIG. 13.

In operation 2105, the master base station 1010 may determine a transmission start alignment interval $T_{AI}[n]$ based on the average traffic load $B_{avg}[n]$ of the second system. For example, the master base station 1010 may determine the transmission start alignment interval $T_{AI}[n]$ using the graph 2000 of FIG. 20. The average traffic load $B_{avg}[n]$ of the second system and the transmission start alignment interval $T_{AI}[n]$ may be in a linear relationship. Such operation in operation 2105 may be performed by the controller 1330 of FIG. 13.

In operation 2107, the master base station 1010 may transmit information on the transmission start alignment interval $T_{AI}[n]$ determined in operation 2105 to the first base station 110. Such operation in operation 2107 may be performed by one or more of the communication unit 1320 and the controller 1330 of FIG. 13.

Although not illustrated in FIG. 21, the first base station 110 may communicate with the terminal 120 of FIG. 1 based on the transmission start alignment interval $T_{AI}[n]$.

Through the operations in operations 2101 to 2107, the first base station 110 and the master base station 1010 may control a transmission start alignment interval according to communication capacity of the second base station 310 and/or the second terminal 320 (i.e., the second system 302). When it is determined the communication capacity between the second base station 310 and the second terminal 320 is high, the first base station 110 and the master base station 1010 may perform communication by setting the transmission start alignment interval to be long. When it is determined the communication capacity between the second base station 310 and the second terminal 320 is low, the first base station 110 and the master base station 1010 may perform communication by setting the transmission start alignment interval to be short. That is, the first base station 110 and the master base station 1010 may improve the throughput of the whole system including the first system 301 and the second system 302 through controlling the transmission start alignment interval.

Figure 22:
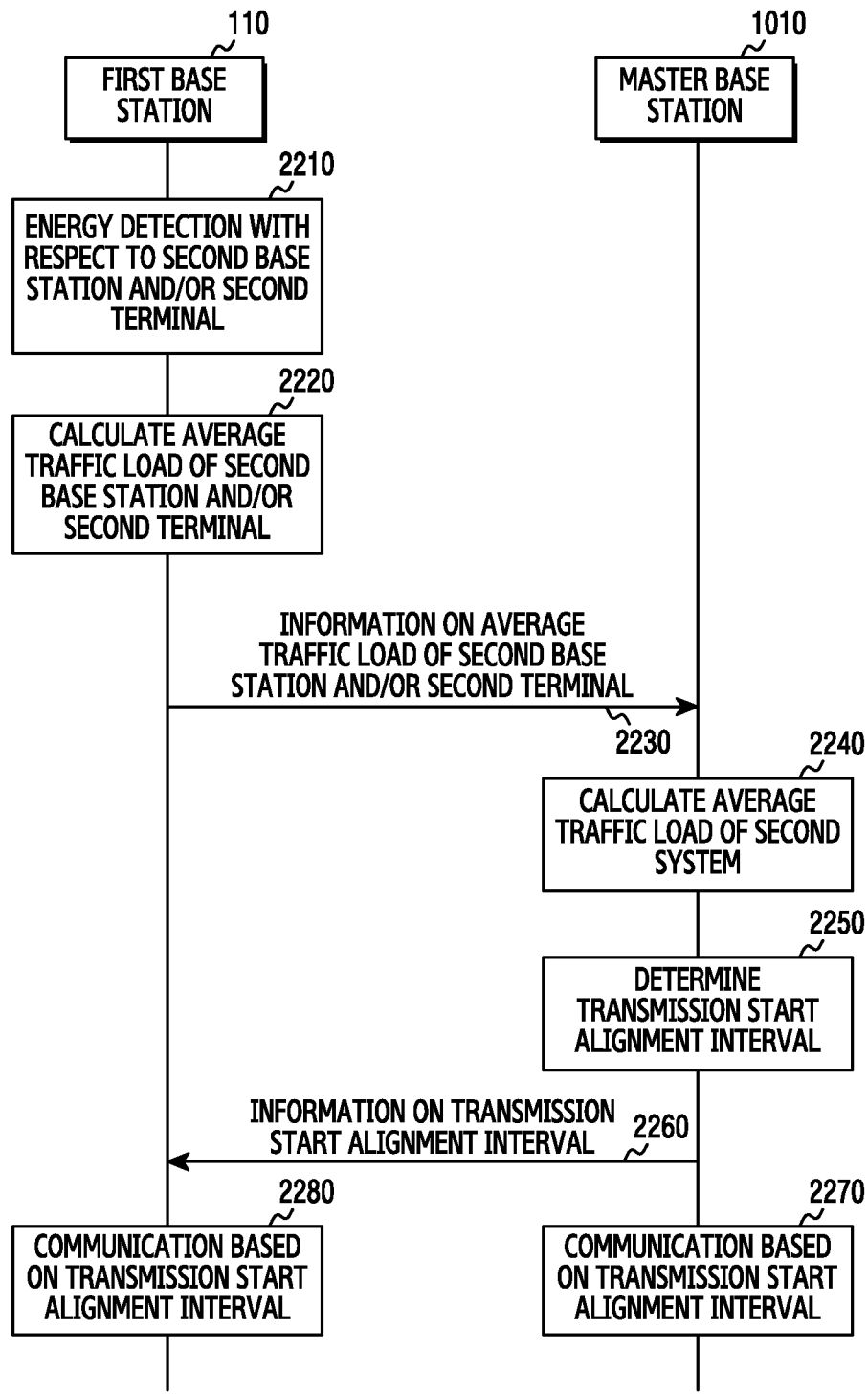
FIG. 22 is a flowchart illustrating operation of a first base station and a master base station according to the first embodiment.

FIG. 22 is a flowchart illustrating operation of a first base station and a master base station according to the first embodiment. Such operational flow may be performed by the base station 110 of FIG. 1 and the base station 1010 of FIG. 10.

Referring to FIG. 22, in operation 2210, the first base station 110 may perform energy detection with respect to the second base station 310 and/or second terminal 320. The first base station 110 may perform energy detection with respect to a frequency shared with the second base station 310 and/or second terminal 320. The first base station 110 may calculate traffic load $b_i[n]$ of the second base station 310 and/or the second terminal 320 at the current subframe (i.e., $n^{th}$ subframe) through the energy detection.

In operation 2220, the first base station 110 may calculate the average traffic $B_i[n]$ load of the second base station 310 and/or the second terminal 320 up to the current subframe based on the traffic load $b_i[n]$ of the second base station 310 and/or the second terminal 320 at the current subframe. For example, the first base station 110 may calculate the average traffic load $B_i[n]$ up to the current subframe using $$B_i[n] = \frac{1}{T_W} \cdot b_i[n] + \left(1 - \frac{1}{T_W}\right) \cdot B_i[n-1].$$

In operation 2230, the first base station 110 may transmit information on the average traffic load $B_i[n]$ up to the current subframe to the master base station 1010.

In operation 2240, the master base station 1010 may calculate the average traffic load $B_{avg}[n]$ of a second system up to the current subframe based on the average traffic load $B_i[n]$ up to the current subframe.

In operation 2250, the master base station 1010 may determine a transmission start alignment interval $T_{AI}[n]$ based on the average traffic load $B_{avg}[n]$ of the second system up to the current subframe.

In operation 2260, the master base station 1010 may transmit information on the transmission start alignment interval $T_{AI}[n]$ to the first base station 110.

In operation 2270, the master base station 1010 may perform communication based on the transmission start alignment interval $T_{AI}[n]$.

In operation 2280, the first base station 110 may perform communication based on the transmission start alignment interval $T_{AI}[n]$.

Figure 23A:
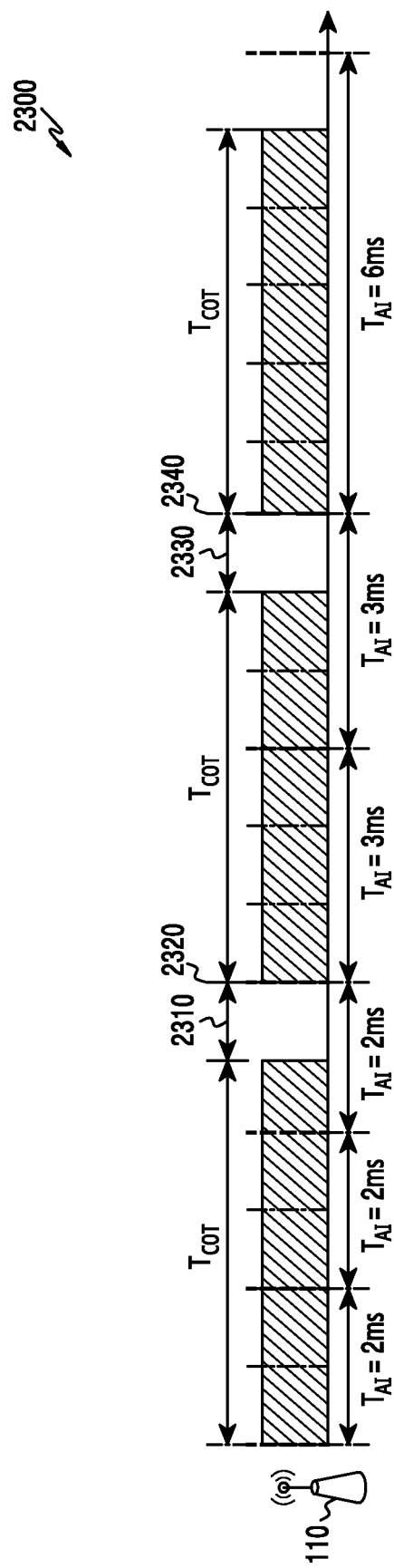
FIG. 23a is a time resource conceptual diagram illustrating a transmission start alignment interval according to a second embodiment.

FIG. 23a is a time resource conceptual diagram illustrating a transmission start alignment interval according to a second embodiment.

In the case of a WLAN system such as Wi-Fi or the like, a period of time (back-off) taken for competition for occupying a channel may be less than or equal to 1 ms on average. Therefore, a method of allocating a fixed period of time to a WALN system that attempts occupying a channel may be considered. The fixed period of time may be a value that varies according to setting. For example, a method and apparatus according to various embodiments may allocate a time resource corresponding to one subframe (i.e., 1 ms) for WLAN. The master base station 1010 of FIG. 10 may determine a transmission start alignment interval $T_{AI}$ by taking into consideration such situation.

Particularly, the master base station 1010 may recognize $T_{COT}$ of the base station 110 in advance. The master base station 1010 may determine the transmission start alignment interval $T_{AI}$ by taking into consideration a time resource of a maximum of 1 ms, which is to be allocated for $T_{COT}$ and the WLAN system (e.g., the second system 302 including the second base station 310 and the second terminal 320 of FIG. 3). For example, the master base station 1010 may determine the transmission start alignment interval $T_{AI}$ using Equation 3 provided below.

$$T_{AI} = \frac{T_{COT} + 1}{G} \qquad \text{Equation 3}$$

In Equation 3, $T_{COT}$ may denote a maximum channel occupancy time of the base station 110. In Equation 3, c may be a randomly selected positive integer. In Equation 3, $T_{AI}$ may denote a transmission start alignment interval. $T_{AI}$ may be a randomly selected positive integer. In Equation 3, c may be a divisor of $T_{COT}+1$. For example, when $T_{COT}+1$ is 6, c may have values of $T_{COT}+1$'s devisors: 1, 2, 3, and 6. In Equation 3, $T_{AI}$ may be a divisor of $T_{COT}+1$. For example, when $T_{COT}+1$ is 6 ms, $T_{AI}$ may have values of 1, 2, 3, and 6 ms.

Referring to FIG. 23a, a time resource conceptual diagram 2300 illustrates operation of the first base station 110 that performs communication based on a transmission start alignment interval $T_{AI}$ determined by the master base station 1010. The maximum channel occupancy time $T_{COT}$ of the first base station 110 may be 5 ms. The master base station 1010 may recognize, in advance, that the maximum channel occupancy time $T_{COT}$ of the first base station 110 is 5 ms. Using the maximum channel occupancy time $T_{COT}$, the master base station 1010 may determine $T_{AI}$ as 1, 2, 3, and 6 ms.

The first base station 110 may perform communication based on $T_{AI}$ having a length of 2 ms, which is determined by the master base station 1010. The first base station 110 may communicate with the terminal 120 of FIG. 1 or the like during the maximum channel occupancy time $T_{COT}$. The first base station 110 may interrupt the communication with the terminal 120 or the like during a time interval 2310 according to a determined rule (e.g., an LBT scheme). Although not illustrated in FIG. 23*a*, the first base station 110 may perform ECCA during the time interval 2310. The first base station 110 may match the end point of the ECCA to a transmission start point (i.e., the start point or the end point of $T_{AI}$), based on $T_{AI}$. The time interval 2310 may be a time resource provided for the second system 302 including the second base station 310 and/or the second terminal 320. The time interval 2310 may be referred to as an idle interval. At a point 2320, the first base station 110 may change $T_{AI}$ from 2 ms to 3 ms. Such change of $T_{AI}$ may be based on information on $T_{AI}$ transmitted from the master base station 1010. At a point 2320, the first base station 110 may resume communication with the terminal 120 or the like based on $T_{AI}$ of 3 ms. According to the determined rule, the first base station 110 may communicate with the terminal 120 or the like during the maximum channel occupancy time $T_{COT}$.

The first base station 110 may interrupt the communication with the terminal 120 or the like during a time interval 2330 according to the determined rule. Although not illustrated in FIG. 23*a*, the first base station 110 may perform ECCA during the time interval 2330. The first base station 110 may match the end point of the ECCA to a transmission start point (i.e., the start point or the end point of $T_{AI}$) based on $T_{AI}$ of 3 ms. The time interval 2330 may be a time resource provided for the second system 302 including the second base station 310 and/or the second terminal 320. The time interval 2330 may be referred to as an idle interval. At a point 2340, the first base station 110 may change $T_{AI}$ from 3 ms to 6 ms. Such change of $T_{AI}$ may be based on information on $T_{AI}$ transmitted from the master base station 1010. At a point 2340, the first base station 110 may resume communication with the terminal 120 or the like based on $T_{AI}$ of 6 ms. According to the determined rule, the first base station 110 may communicate with the terminal 120 or the like during the maximum channel occupancy time $T_{COT}$.

Figure 23B:
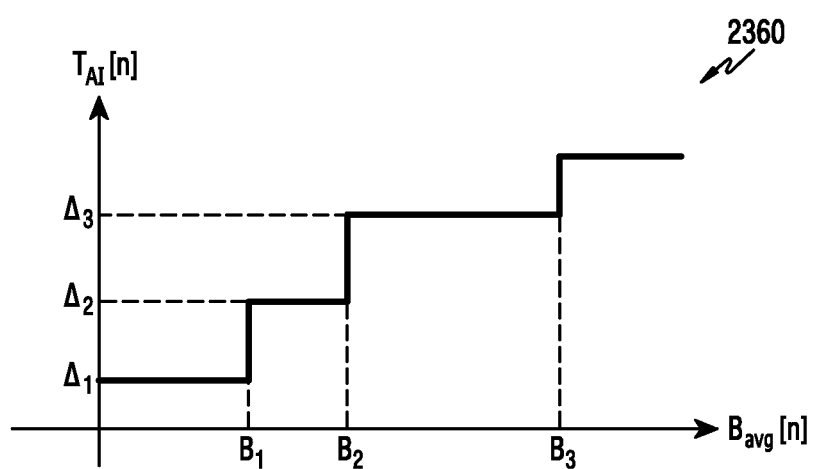
FIG. 23b is a graph illustrating a relationship between a transmission start alignment interval and average traffic load of a second system according to a second embodiment.

FIG. 23*b* is a graph illustrating the relationship between a transmission start alignment interval and the average traffic load of the second system according to the second embodiment.

Referring to FIG. 23*b*, the horizontal axis of graph 2360 may indicate the average traffic load $B_{avg}[n]$ of the second system. The vertical axis of the graph 2360 may indicate a transmission start alignment interval $T_{AI}[n]$. In the graph 2360, the relationship between the average traffic load $B_{avg}[n]$ of the second system and the transmission start alignment interval $T_{AI}[n]$ may be expressed by Equation 4 provided below.

$$T_{AI}[n] = \begin{cases} \Delta_1, & B_{avg}[n] \leq B_1 \\ \Delta_2, & B_1 \leq B_{avg}[n] < B_2 \\ \vdots & \vdots \\ \Delta_M, & B_{avg}[n] \geq B_M \end{cases} \quad \text{Equation 4}$$

In Equation 4, $B_{avg}[n]$ may be the average traffic load of the second system 302 up to an $n^{th}$ subframe. In Equation 4, $\Delta_1, \Delta_2, \ldots, \Delta_M$ may be a transmission start alignment interval $T_{AI}[n]$ that corresponds to each range. In Equation 4, $\Delta_1, \Delta_2, \ldots, \Delta_M$ may be divisors of $T_{COT}+1$.

The transmission start alignment interval $T_{AI}[n]$ may be determined by the master base station 1010 or the like.

The transmission start alignment interval $T_{AI}[n]$ according to the second embodiment may be expressed as a divisor of $T_{COT}+1$, thereby having an limited integer value. Since $T_{AI}[n]$ has a limited integer value, the first base station 110 and the master base station 1010 according to the second embodiment may reduce complexity.

Figure 24:
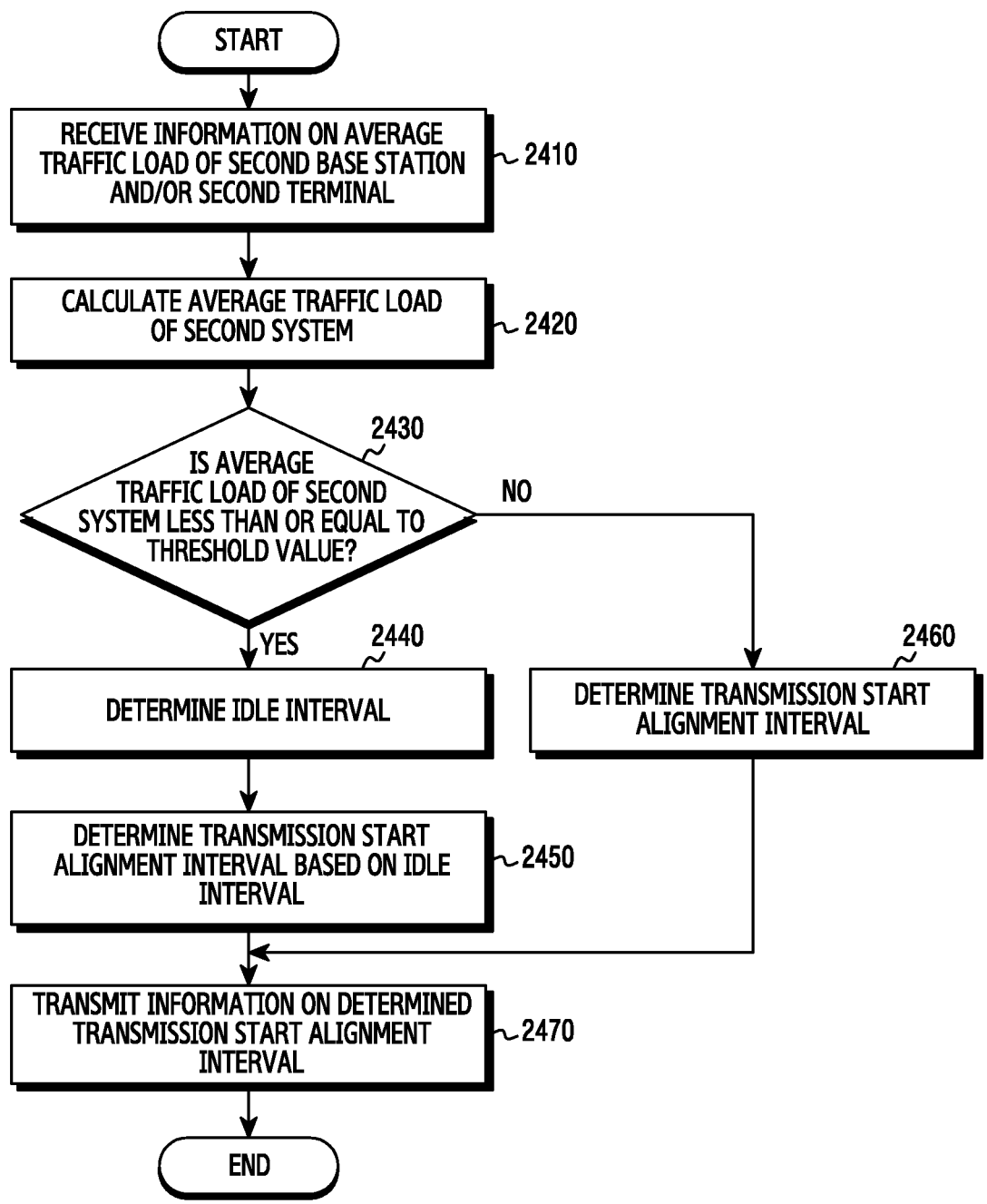
FIG. 24 is a flowchart illustrating operation of a master base station according to the second embodiment.

FIG. 24 is a flowchart illustrating operation of a master base station according to the second embodiment. Such operational flow may be performed by the master base station 1010.

Referring to FIG. 24, in operation 2410, the master base station 1010 may receive information on the average traffic load of the second base station 310 and/or the second terminal 320 from the first base station 110. For example, the master base station 1010 may receive, from the first base station 110, the average traffic load $B_i[n]$ of the second base station 310 and/or the second terminal 320 up to the current subframe (i.e., an $n^{th}$ subframe), which is calculated through $$B_i[n] = \frac{1}{T_W} \cdot b_i[n] + \left(1 - \frac{1}{T_W}\right) \cdot B_i[n-1].$$

Such operation in operation 2410 may be performed by one or more of the communication unit 1320 and the controller 1330 of FIG. 13.

In operation 2420, the master base station 1010 may calculate the average traffic load of the second system based on the average traffic load $B_i[n]$. For example, the master base station 1010 may calculate the average traffic load $B_{avg}[n]$ of the second system through $$B_{avg}[n] = \frac{1}{N} \sum_{i=1}^{N} B_i[n].$$

Such operation in operation 2420 may be performed by the controller 1330 of FIG. 13.

In operation 2430, the master base station 1010 may determine whether the average traffic load of the second system is less than or equal to a threshold value. The threshold value may be a value determined in advance by the master base station 1010. The threshold value may be a value used when the master base station 1010 sets an operation of determining a transmission start alignment interval. The master base station 1010 may determine a mode of the operation of determining a transmission start alignment interval through the magnitude of the average traffic load of the second system 302. For example, when it is determined that a resource of 1 ms is sufficient to process the traffic load of a heterogeneous system that shares the same frequency, such as the second system 302 including the second base station 310 and/or the second terminal 320 of FIG. 3, the master base station 1010 may determine a transmission start alignment interval through operations 2440 to 2450. For example, when it is determined that a resource of 1 ms is insufficient to process the traffic load of the heterogeneous system that shares the same frequency, such as the second system 302 including the second base station 310 and/or the second terminal 320 of FIG. 3, the master base station 1010 may determine a transmission start alignment interval through operation 2460. Such operation in operation 2430 may be performed by the controller 1330 of FIG. 13.

In operation 2440, the master base station 1010 may determine an idle interval. The idle interval may indicate the time interval 2310 or the time interval 2330 of FIG. 23a. The idle interval may be a time interval kept vacant for the second system 302 including the second base station 310 and/or the second terminal 320. For example, the master base station 1010 may determine the idle interval as 1 ms, as illustrated in the embodiment of FIG. 23a. The master base station 1010 may determine the idle interval as another value. For example, when it is determined that the idle interval corresponding to the average traffic load of the second system 302 is 3 ms, the master base station 1010 may determine the idle interval as 3 ms. Such operation in operation 2440 may be performed by the controller 1330 of FIG. 13.

In operation 2450, the master base station 1010 may determine a transmission start alignment interval $T_{AI}[n]$ based on the determined idle interval, the maximum channel occupancy time $T_{COT}$ of the first base station 110 or the like, and the average traffic load of the second system 302. For example, when the idle interval is determined as 1 ms, the master base station 1010 may determine a divisor of $T_{COT}+1$ as the transmission start alignment interval $T_{AI}[n]$. Such operation in operation 2450 may be performed by the controller 1330 of FIG. 13.

When the average traffic load of the second system 302 exceeds a threshold value, the master base station 1010 may determine the transmission start alignment interval $T_{AI}[n]$ according to the first embodiment in operation 2460. Such operation in operation 2460 may correspond to operation 2105 of FIG. 21. Such operation in operation 2460 may be performed by the controller 1330 of FIG. 13.

In operation 2470, the master base station 1010 may transmit information on the transmission start alignment interval determined by performing operation 2450 or operation 2460, to the first base station 110 or the like. Such operation in operation 2470 may be performed by the controller 1330 of FIG. 13.

Although not illustrated in FIG. 13, the master base station 1010 may perform communication based on the transmission start alignment interval. Also, the first base station 110 may perform communication based on the transmission start alignment interval.

By performing the operations of FIG. 24, the first base station 110 and the master base station 1010 may provide a time resource for the second system 302, and may decrease the complexity of the master base station 1010 or the like. The first base station 110 and the master base station 1010 may improve the throughput of the whole system including the first system 301 and the second system 302 through the transmission start alignment interval.

Figure 25:
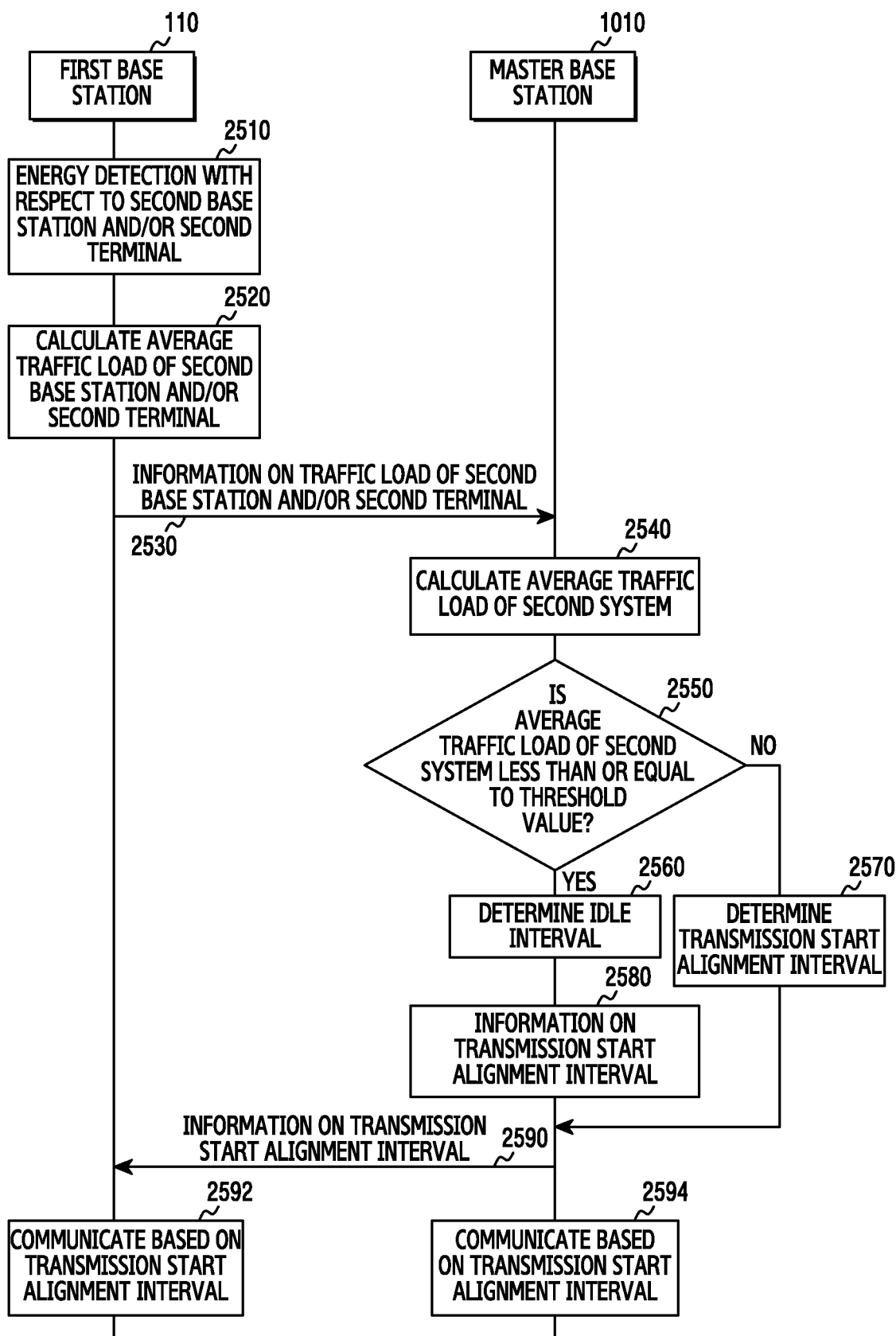
FIG. 25 is a flowchart illustrating operation of a first base station and a master base station according to the second embodiment.

FIG. 25 is a flowchart illustrating operation of a first base station and a master base station according to the second embodiment. Such operational flow may be performed by the first base station 110 of FIG. 1 and the master base station 1010 of FIG. 10.

Referring to FIG. 25, in operation 2510, the first base station 110 may perform energy detection with respect to the second base station 310 and/or the second terminal 320 of FIG. 3. The energy detection may be performed with respect to a frequency band that the first base station 110 shares with the second base station 310 and/or second terminal 320. The energy detection may be an operation of obtaining the current traffic load (i.e., the traffic load at an $n^{th}$ subframe) of the second base station 310 and/or the second terminal 320.

In operation 2520, the first base station 110 may calculate the traffic load of the second base station 310 and/or the second terminal 320 up to the current subframe using the traffic load of the second base station 310 and/or the second terminal 320, which has been obtained in operation 2510.

In operation 2530, the first base station 110 may transmit information on the traffic load of the second base station 310 and/or the second terminal 320 up to the current subframe.

In operation 2540, the master base station 1010 may calculate the average traffic load of the second system 302 based on the received traffic load of the second base station 310 and/or the second terminal 320 up to the current subframe.

In operation 2550, the master base station 1010 may determine whether the average traffic load of the second system 302 is less than or equal to a threshold value. Although not illustrated in FIG. 25, the master base station 1010 may determine whether the average traffic load of the second system 302 is within a threshold range. For example, when a change of the average traffic load of the second system 302 that is received by the master base station 1010 is small, the master base station 1010 may set a threshold range for determining an idle interval. In this instance, in operation 2550, the master base station 1010 may determine whether the average traffic load of the second system 302 is included in the threshold range.

When the average traffic load of the second system 302 is less than or equal to the threshold value (or when the average traffic load of the second system 302 is within the threshold range), the master base station 1010 may determine an idle interval in operation 2560. For example, the idle interval may be the time interval 2310 or the time interval 2330 of FIG. 23a.

In operation 2580, the master base station 1010 may determine a transmission start alignment interval based on the idle interval and the maximum channel occupancy time of the first base station 110.

When the average traffic load of the second system 302 is greater than the threshold value (or when the average traffic load of the second system 302 is out of the threshold range), the master base station 1010 may determine the transmission start alignment interval according to the first embodiment in operation 2570.

In operation 2590, the master base station 1010 may transmit information on the determined transmission start alignment interval to the first base station 110.

In operation 2592, the first base station 110 may communicate with the terminal 120 of FIG. 1 or the like based on the transmission start alignment interval.

In operation 2594, the master base station 1010 may perform communication based on the transmission start alignment interval.

Figure 26A:
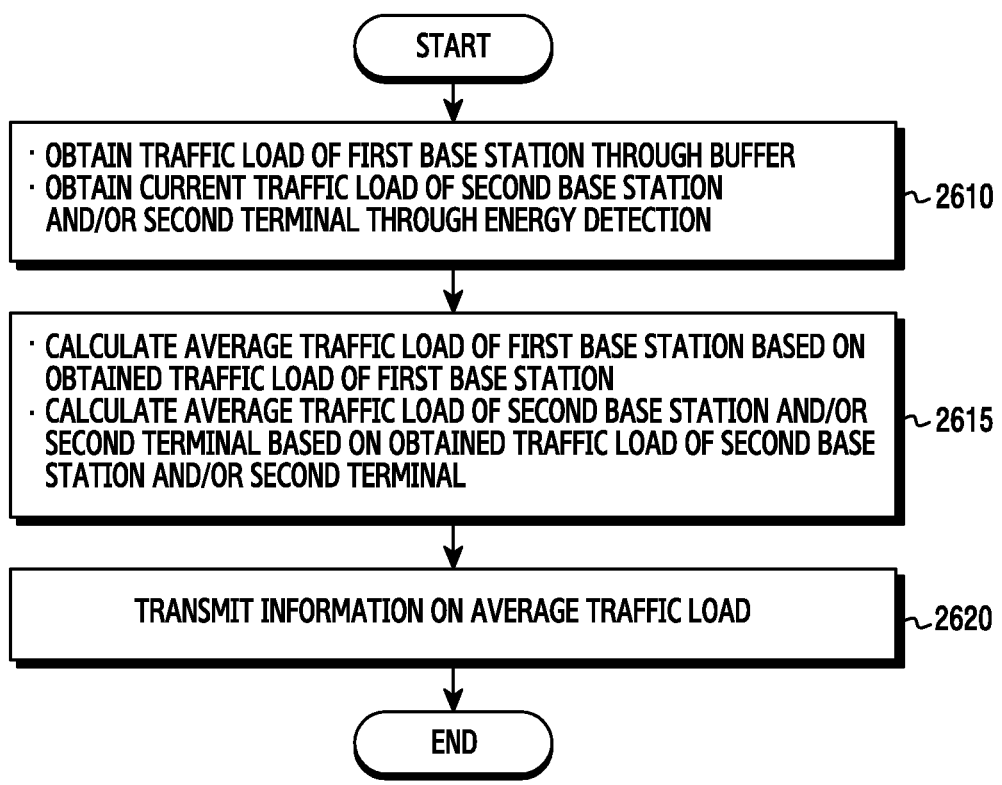
FIG. 26a is a flowchart illustrating operation of a first base station according to a third embodiment.

FIG. 26a is a flowchart illustrating operation of a first base station according to a third embodiment.

Referring to FIG. 26a, in operation 2610, the first base station 110 may obtain the current traffic load of the first base station 110 through a buffer. The buffer may be included in one of the communication unit 1220, the controller 1230, and the storage unit 1240 of FIG. 12. The first base station 110 may detect whether a packet exists in the buffer. For example, the first base station 110 may obtain traffic load $BO_i[n]$ of the first base station 110 using Equation 5 provided below.

$$BO_i[n] = \frac{\sum_{k=n-T_W+1}^{n} \beta_i[k]}{T_W}$$ Equation 5

In Equation 5, $\beta_i[k]$ displays whether a packet exists in the buffer of an $i^{th}$ base station (e.g., the first base station 110) at a $K^{th}$ slot. For example, the fact that $\beta_i[k]$ is 1 may indicate that a packet exists in the buffer of the first base station 110. The fact that $\beta_i[k]$ is 0 may indicate that a packet does not exist in the buffer of the first base station 110. In Equation 5, $T_W$ may be a period of time during which the first base station 110 performs detection in the buffer. The first base station 110 may detect whether a packet exists in the buffer during $T_W$. Traffic load of the first base station 110 may be referred to as a buffer occupancy (BO) value.

In operation 2610, the first base station 110 may obtain the current traffic load of the second base station 310 and/or second terminal 320 through the energy detection. For example, the first base station 110 may obtain the current traffic load $BO_i[n]$ of the second base station 310 and/or second terminal 320 through the method according to the first embodiment. Such operation in operation 2610 may be performed by one or more of the communication unit 1220 and the controller 1230 of FIG. 12.

In operation 2615, the first base station 110 may calculate the average traffic load $\overline{BO}_i[n]$ of the first base station 110 using the current traffic load $BO_i[n]$ of the first base station 110. For example, the first base station 110 may calculate the average traffic load $\overline{BO}_i[n]$ of the first base station 110 using Equation 6 provided below.

$$\overline{BO}_i[n] = \frac{1}{T_W} \cdot BO_i[n] + \left(1 - \frac{1}{T_W}\right) \cdot \overline{BO}_i[n-1]$$ Equation 6

In Equation 6, $BO_i[n]$ may indicate the current traffic load of the first base station 110. In Equation 6, $\overline{BO}_i[n]$ may indicate a previously calculated average traffic load.

In operation 2615, the first base station 110 may calculate the average traffic load $B_i[n]$ of the second base station 310 and/or the second terminal 320 using the current traffic load $b_i[n]$ of the second base station 310 and/or the second terminal 320. For example, the first base station 110 may calculate the average traffic load $B_i[n]$ of the second base station 310 and/or second terminal 320 through the method according to the first embodiment. Such operation in operation 2615 may be performed by the controller 1230 of FIG. 12.

In operation 2620, the first base station 110 may transmit the average traffic load $\overline{BO}_i[n]$ and the average traffic load $B_i[n]$ the master base station 1010. Such operation in operation 2620 may be performed by one or more of the communication unit 1220 and the controller 1230 of FIG. 12.

Through operations 2610 and 2620, the first base station 110 may recognize the resource usage state of the first base station 110 and the resource usage state of the second base station and/or the second terminal. Through operations 2610 and 2620, the first base station 110 may transmit the resource usage state of the first base station 110 and the resource usage state of the second base station and/or the second terminal to the master base station 1010 such that resources shared between the first system 301 and the second system 302 are more accurately distributed.

Figure 26B:
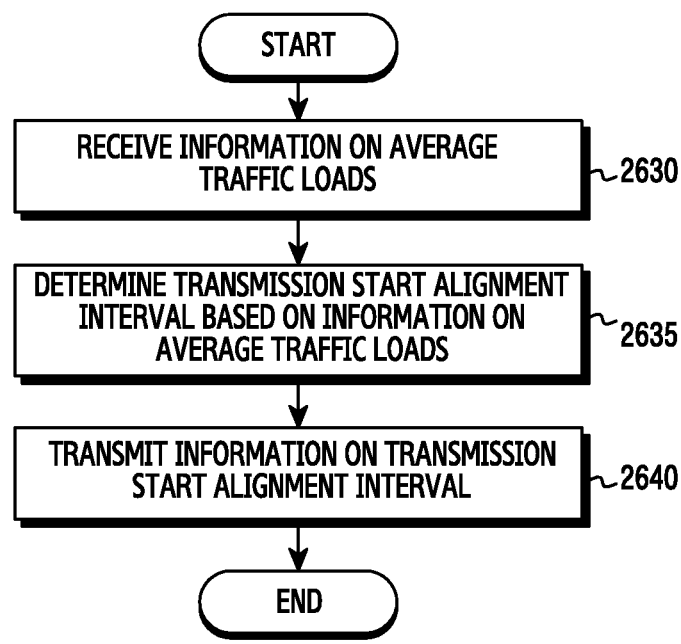
FIG. 26b is a flowchart illustrating operation of a master base station according to the third embodiment.

FIG. 26b is a flowchart illustrating operation of a master base station according to the third embodiment. Such operational flow may be performed by the master base station 1010 of FIG. 10.

Referring to FIG. 26b, in operation 2630, the master base station 1010 may receive information on the average traffic load $\overline{BO}_i[n]$ of the first base station 110 and the average traffic load $B_i[n]$ of the second base station and/or second terminal. Such operation in operation 2630 may be performed by one or more of the communication unit 1320 and the controller 1330 of FIG. 13.

In operation 2635, the master base station 1010 may determine a transmission start alignment interval $T_{AI}$ based on the average traffic load $\overline{BO}_i[n]$ of the first base station 110 and the average traffic load $B_i[n]$ of the second base station and/or the second terminal. The master base station 1010 may calculate the average traffic load $B_{avg}^{LAA}[m]$ of the first system 301 of FIG. 3 (i.e., a group of base stations that share a frequency band) using Equation 7 provided below.

$$B_{avg}^{LAA}[m] = \frac{1}{N}\sum_{i=1}^{N} \overline{BO}_i[m]$$ Equation 7

In Equation 7, m denotes an $m^{th}$ subframe. m may be a value corresponding to n. N may indicate the number of a plurality of first base stations 110.

That is, the master base station 1010 may calculate the average traffic load of the first system 301 using an arithmetic mean.

In operation 2635, the master base station 1010 may calculate the average traffic load $B_{avg}^{WiFi}[m]$ of the second system 302 of FIG. 3 using Equation 8 provided below.

$$B_{avg}^{WiFi}[m] = \frac{1}{N}\sum_{i=1}^{N} B_i[m]$$ Equation 8

In Equation 8, m denotes an $m^{th}$ subframe. m may be a value corresponding to n. N may indicate the number of a plurality of first base station 110.

That is, the master base station 1010 may calculate the average traffic load of the second system 302 using an arithmetic mean.

In operation 2635, the master base station 1010 may determine the transmission start alignment interval based on the average traffic load $B_{avg}^{LAA}[m]$ and the average traffic load $B_{avg}^{WiFi}[m]$. For example, the transmission start alignment interval $T_{AI}$ may be determined based on the average traffic load $B_{avg}^{LAA}[m]$, the average traffic load $B_{avg}^{WiFi}[m]$ and a threshold value $B_i$. For example, the transmission start alignment interval $T_{AI}$ may be determined by Equation 9 provided below.

$$T_{AI} = \begin{cases} \Delta_1, & B_{avg}^{LAA} \leq B_1 \\ \Delta_2, & B_1 \leq B_{avg}^{LAA} < B_2 \\ \vdots \\ \Delta_K, & B_{K-1} \leq B_{avg}^{LAA} < B_K = B_i \\ \Delta_{K+1}, & B_K \leq B_{avg}^{WiFi} < B_{K+1} \\ \vdots \\ \Delta_M, & B_{avg}^{WiFi} \geq B_M \end{cases}$$ Equation 9

In Equation 9, $\Delta_1, \Delta_2, \ldots, \Delta_M$ may be divisors determined by $T_{COT}+1$ The transmission start alignment interval $T_{AI}$ may be determined to have one of the values in a range from $\Delta_1$ to $\Delta_M$. Such operation in operation 2630 may be performed by the controller 1330 of FIG. 13.

In operation 2640, the master base station 1010 may transmit information on the determined transmission start alignment interval to the first base station 110. Such operation in operation 2640 may be performed by one or more of the communication unit 1320 and the controller 1330 of FIG. 13.

Through operations 2630 and 2640, the master base station 1010 may determine the transmission start alignment interval by taking into consideration the traffic load of the first system 301 and the traffic load of the second system 302. The first base station 110 and the master base station 1010 may improve the throughput of the whole system including the first system 301 and the second system 302 through the transmission start alignment interval.

Figure 27:
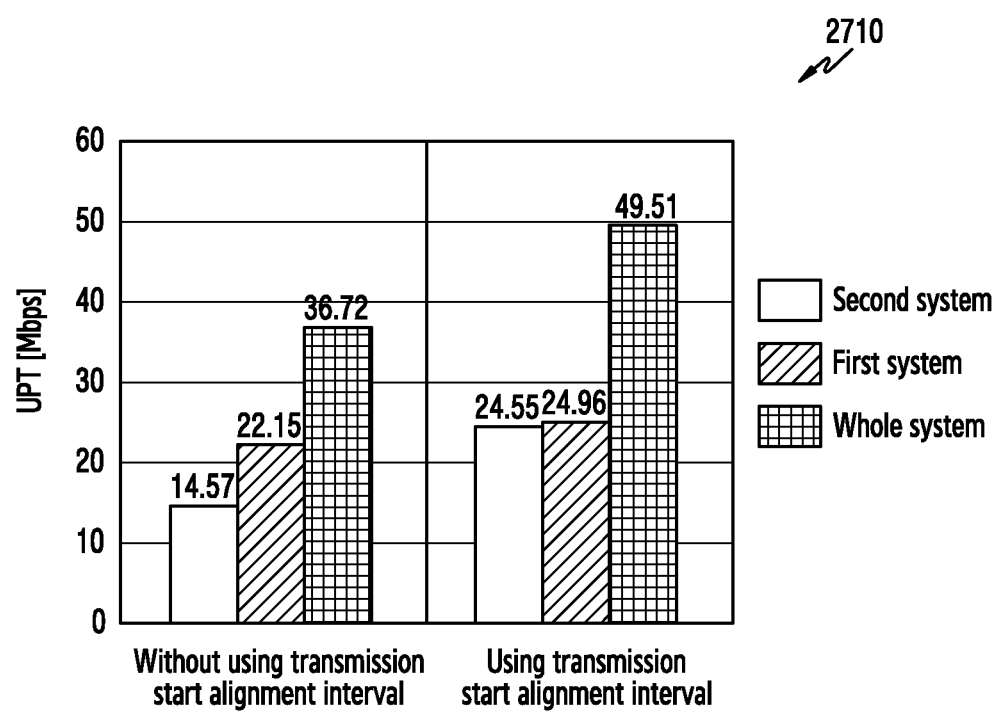
FIG. 27 is a graph illustrating the comparison of system performances between a case that uses a transmission start alignment interval and a case that does not.

FIG. 27 is a graph illustrating the comparison of system performances between a case that uses a transmission start alignment interval and a case that does not.

Referring to FIG. 27, the left side of the horizontal axis of graph 2710 shows the first system 301, the second system 302, and the whole system illustrated in FIG. 3 in the case in which a transmission start alignment interval is not used. The right side of the horizontal axis of graph 2710 shows the first system 301, the second system 302, and the whole system illustrated in FIG. 3 in the case in which a transmission start alignment interval is used. The vertical axis of the graph 2710 indicates a user perceived throughput (UPT). A unit of the vertical axis of the graph 2710 is the number of mega bits per second (i.e., Mbps).

When the transmission start alignment interval is not used, the throughput of the second system 302 is 14.57 Mbps, the throughput of the first system 301 is 22.15 Mbps, and the throughput of the whole system is 36.72 Mbps. When the transmission start alignment interval is used, the throughput of the second system 302 is 24.55 Mbps, the throughput of the first system 301 is 24.96 Mbps, and the throughput of the whole system is 49.51 Mbps. The graph 2710 shows that the case that uses the transmission start alignment interval improves the throughput of each system and the throughput of the whole system better than the case that does not use the transmission start alignment interval.

An operation method of a first base station according to various embodiments may include: receiving information on a transmission start alignment interval; and communicating with a first terminal based on the transmission start alignment interval, and the transmission start alignment interval is determined based on first information, which is related to one or more of a second base station and a second terminal of a second system that shares a frequency band with a first system. The transmission start alignment interval may be an interval shared between the base station and at least one other base station of the first system that shares the frequency band with the base station. The operation method of the first base station may further include: transmitting the first information to a master base station; and receiving information on the transmission start alignment interval from the master base station. The first information may be information on the average traffic load of one or more of the second base station and the second terminal. The operation method of the first base station may further include calculating the average traffic load of one or more of the second base station and the second terminal. The operation method of the first base station may include: performing energy detection with respect to a signal transmitted or received by one or more of the second base station and the second terminal; and calculating the average traffic load based on the energy detection. The operation of calculating the average traffic load based on the energy detection may include: determining the current traffic load of one or more of the second base station and the second terminal based on the energy detection; and calculating the average traffic load based on the current average traffic load and previously calculated average traffic load. The operation of calculating the average traffic load based on the current traffic load and the previously calculated average traffic load may include calculating the average traffic load of one or more of the second base station and the second terminal based on an equation:

$$B_i[n] = \frac{1}{T_W} \cdot b_i[n] + \left(1 - \frac{1}{T_W}\right) \cdot B_i[n-1].$$

Here, i denotes the base station. n denotes an $n^{th}$ subframe. $T_W$ denotes a predetermined period of time. $b_i[n]$ denotes the current traffic load. $B_i[n-1]$ denotes the previously calculated average traffic load. $B_i[n]$ denotes the average traffic load.

Also, the transmission start alignment interval may be an interval for aligning transmission start points of the base station and at least one other base station of the first system that shares the frequency band with the base station.

An operation method of a master base station according to various embodiments may include: receiving first information related to one or more of a second base station and a second terminal included in a second system that shares a frequency band, from at least one other base station that shares the frequency band; determining a transmission start alignment interval based on the received first information; and transmitting information on the transmission start alignment interval to at least one other base station. The transmission start alignment interval may be an interval for aligning the transmission start point of the at least one other base station that shares the frequency band. The first information may be information on the average traffic load of one or more of the second base station and the second terminal. The operation of determining the transmission start alignment interval may include: calculating traffic load of the second system based on the average traffic load; and determining the transmission start alignment interval based on the average traffic load of the second system. The operation of determining the transmission start alignment interval may include: when the average traffic load of the second system is less than a threshold value, determining a predetermined interval before the end point of the transmission start alignment interval as an idle interval; and determining the transmission start alignment interval based on the idle interval. The idle interval may be one subframe.

An apparatus of a first base station according to various embodiments may include a communication unit configured to transmit or receive information, and a controller coupled with the communication unit. The controller may be configured to receive information on the transmission start alignment interval, and to communicate with a first terminal based on the transmission start alignment interval. The transmission start alignment interval may be determined based on first information related to one or more of a second base station and a second terminal of a second system that shares a frequency band with a first system. The transmission start alignment interval is an interval shared between the base station and at least one other base station of the first system that shares the frequency band with the base station. The controller may be further configured to transmit the first information to a master base station, and may be further configured to receive information on the transmission start alignment interval from the master base station. The first information is information on the average traffic load of one or more of the second base station and the second terminal. The controller may be further configured to calculate the average traffic load of one or more of the second base station and the second terminal. The controller may be configured to perform energy detection with respect to a signal transmitted or received by one or more of the second base station and the second terminal during a predetermined period of time, and may be configured to calculate the average traffic load based on the energy detection. The controller may be configured to determine the current traffic load of one or more of the second base station and the second terminal based on the energy detection, and may be configured to calculate the average traffic load based on the current traffic load and previously calculated average traffic load. The controller may be configured to calculate the average traffic load of one or more of the second base station and the second terminal based on an equation:

$$B_i[n] = \frac{1}{T_W} \cdot b_i[n] + \left(1 - \frac{1}{T_W}\right) \cdot B_i[n-1].$$

In the equation, i denotes the base station. n denotes an $n^{th}$ subframe. $T_W$ denotes a predetermined period of time. $b_i[n]$ denotes the current traffic load. $B_i[n-1]$ denotes the previously calculated average traffic load. $B_i[n]$ denotes the average traffic load.

Also, the transmission start alignment interval is an interval for aligning transmission start points of the base station and at least one other base station of the first system that shares the frequency band with the base station.

An apparatus of a master base station according to various embodiments may include a communication unit configured to transmit or receive information, and a controller coupled with the communication unit. The controller may be configured to receive first information related to one or more of a second base station and a second terminal included in a second system that shares a frequency band from at least one other base station that shares the frequency band, may be configured to determine a transmission start alignment interval based on the received first information, and may be configured to transmit information on the transmission start alignment interval to at least one other base station. The transmission start alignment interval may be an interval for aligning the transmission start point of the at least one other base station that shares the frequency band. The first information is information on the average traffic load of one or more of the second base station and the second terminal. The controller may be configured to calculate traffic load of the second system based on the average traffic load, and may be configured to determine the transmission start alignment interval based on the traffic load of the second system. When the average traffic load of the second system is less than a threshold value, the controller may be configured to determine a predetermined interval before the end point of the transmission start alignment interval as an idle interval, and may be configured to determine the transmission start alignment interval based on the idle interval. The idle interval may be one subframe.

Methods stated in claims and/or specifications according to various embodiments may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

Although the embodiment has been described in the detailed description of the present disclosure, the present disclosure may be modified in various forms without departing from the scope of the present disclosure. Therefore, the scope of the present disclosure should not be defined as being limited to the embodiments, but should be defined by the appended claims and equivalents thereof.

The invention claimed is:

1. A method performed by a first base station in a wireless communication system, the method comprising:
   performing an energy detection for a frequency band shared between the first base station in a first system and a second base station in a second system;
   transmitting first information associated with a first traffic load for the first base station and a second traffic load for the second base station which is obtained based on the energy detection;
   receiving second information associated with a time interval identified based on the first traffic load and the second traffic load; and transmitting data to a first terminal in the first system during a transmission duration that starts from a time point, over the frequency band, wherein the time point is identified based on an end point of the time interval and a time resource provided in the second system.

2. The method of claim 1, wherein the time interval is an interval shared between the first base station and at least one other base station that shares the frequency band with the first base station in the first system, and
wherein an end point of an energy detection performed by the at least one other base station and a start point of a transmission duration of the at least one other base station are matched based on the time interval.

3. The method of claim 1, wherein the first information comprises information on an average traffic load of the second base station.

4. The method of claim 3, further comprising:
calculating the average traffic load of the second base station.

5. The method of claim 4, wherein the calculating the average traffic load comprises:
performing the energy detection with respect to a signal transmitted or received by the second base station during a predetermined period of time; and
calculating the average traffic load based on the energy detection performed during the predetermined period of time.

6. The method of claim 1, further comprising:
performing a second energy detection such that the end point of the second energy detection matches a start point of a subframe of the first base station.

7. The method of claim 1, further comprising:
obtaining a current traffic load of the first based station based on a buffer;
obtaining a current traffic load of the second base station based on the energy detection; and
generating the first information based on the current traffic load of the first based station and the current traffic load of the second based station.

8. The method of claim 1, wherein the time interval is identified based on a magnitude of interference associated with the first traffic load and the second traffic load.

9. A base station comprising:
a transceiver; and
at least one processor operatively coupled with the transceiver, wherein the at least one processor is configured to:
receive, from a first base station in a first system, first information associated with a first traffic load for the first base station and a second traffic load of a second base station in a second system, wherein the second traffic load is obtained based on an energy detection,
identify a time interval based on the first traffic load and the second traffic load included in the first information, and
transmit, to the first base station, second information associated with the time interval,
wherein the energy detection for a frequency band shared between the first base station and the second base station is performed by the first base station,
wherein a time point is identified based on an end point of the time interval and a time resource provided in the second system.

10. The base station of claim 8, wherein the first information comprises information on an average traffic load of the second base station.

11. The base station of claim 10, wherein, in order to identify the time interval, the at least one processor is further configured to:
calculate the second traffic load of the second system based on the average traffic load, and
identify the time interval based on the second traffic load of the second system.

12. The base station of claim 11, wherein, in order to identify the time interval, the at least one processor is further configured to control to:
if the average traffic load of the second system is less than or equal to a threshold value, identify a predetermined time interval before an end point of the time interval as an idle interval for the second system, and
identify the time interval based on the idle interval.

13. The base station of claim 11, wherein, in order to identify the time interval, the at least one processor is further configured to:
if the average traffic load of the second system is greater than a threshold value, identify a length of the time interval to be in a linear relationship with the calculated traffic load of the second system.

14. The base station of claim 9, wherein the first information further comprises information on the first traffic load obtained by identifying whether a packet exists in a buffer of the first base station.

15. A first base station in a wireless communication system, the first base station comprising:
a transceiver; and
at least one processor operatively coupled with the transceiver, wherein the at least one processor is configured to:
perform an energy detection for a frequency band shared between the first base station in a first system and a second base station in a second system,
transmit first information comprising a first traffic load for the first base station and a second traffic load for the second base station which is obtained based on the energy detection,
receive second information associated with a time interval identified based on the first traffic load and the second traffic load, and
transmit data to a first terminal in the first system during a transmission duration that starts from a time point, over the frequency band, and
wherein the time point is identified based on an end point of the time interval and a time resource provided in the second system.

16. The first base station of claim 15, wherein the time interval is an interval shared between the first base station and at least one other base station that shares the frequency band with the first base station in the first system,
wherein an end point of an energy detection performed by the at least one other base station and a start point of a transmission duration of the at least one other base station are matched based on the time interval.

17. The first base station of claim 15, wherein the first information comprises information on an average traffic load of the second base station.

18. The first base station of claim 17, wherein the at least one processor is configured to calculate the average traffic load of the second base station.

19. The first base station of claim 18, wherein the at least one processor is configured to:
perform the energy detection with respect to a signal transmitted or received by the second base station during a predetermined period of time, and calculate the average traffic load based on the energy detection performed during the predetermined period of time.

20. The first base station of claim 15, wherein the at least one processor is further configured to:

perform a second energy detection such that the end point of the second energy detection matches a start point of a subframe of the first base station.

\* \* \* \* \*